US011162698B2

(12) United States Patent
Ajax et al.

(10) Patent No.: US 11,162,698 B2
(45) Date of Patent: Nov. 2, 2021

(54) THERMOSTAT WITH EXHAUST FAN CONTROL FOR AIR QUALITY AND HUMIDITY CONTROL

(71) Applicant: Johnson Controls Technology Company, Auburn Hills, MI (US)

(72) Inventors: Michael J. Ajax, Milwaukee, WI (US); Joseph R. Ribbich, Waukesha, WI (US); Nicholas S. Van Derven, Wauwatosa, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 338 days.

(21) Appl. No.: 15/953,166

(22) Filed: Apr. 13, 2018

(65) Prior Publication Data
US 2018/0299150 A1 Oct. 18, 2018

Related U.S. Application Data

(60) Provisional application No. 62/485,784, filed on Apr. 14, 2017.

(51) Int. Cl.
*F24F 11/00* (2018.01)
*F24F 11/61* (2018.01)
(Continued)

(52) U.S. Cl.
CPC ...... *F24F 11/0001* (2013.01); *F24F 11/0008* (2013.01); *F24F 11/61* (2018.01);
(Continued)

(58) Field of Classification Search
None
See application file for complete search history.

(56) References Cited

U.S. PATENT DOCUMENTS 4,107,464 A    8/1978   Lynch et al.
4,873,649 A   10/1989   Grald et al.
(Continued)

FOREIGN PATENT DOCUMENTS

CA    2466854 C    4/2008
CA    2633200 C    1/2011
(Continued)

OTHER PUBLICATIONS

International Search Report for International Application No. PCT/US2018/027610, dated Oct. 18, 2018, 2 pages.
(Continued)

*Primary Examiner* — Sean Shechtman
(74) *Attorney, Agent, or Firm* — Foley & Lardner LLP

(57) ABSTRACT

A system for controlling air quality of a building space includes an air quality sensor configured to sense the air quality of the building space, an exhaust fan configured to exhaust air from inside the building space to outside the building space, a switch device configured to control the exhaust fan to exhaust the air from inside the building space to outside the building space, and a controller comprising a processing circuit. The processing circuit is configured to determine an air quality level of the building space based on the air quality sensor, determine whether the air quality level is less than an air quality threshold, and cause the switch device to operate the exhaust fan to exhaust air from inside the building space to outside the building space in response to a determination that the air quality level is less than the air quality threshold.

20 Claims, 11 Drawing Sheets

(51) Int. Cl.

| | | |
|---|---|---|
| *G05B 19/042* | (2006.01) | |
| *F24F 11/56* | (2018.01) | |
| *F24F 110/20* | (2018.01) | |
| *F24F 110/66* | (2018.01) | |
| *F24F 110/70* | (2018.01) | |
| *F24F 110/12* | (2018.01) | |
| *F24F 110/22* | (2018.01) | |
| *F24F 110/10* | (2018.01) | |
| *F24F 110/50* | (2018.01) | |

(52) U.S. Cl.
CPC ............ *G05B 19/042* (2013.01); *F24F 11/56* (2018.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/66* (2018.01); *F24F 2110/70* (2018.01); *G05B 2219/2614* (2013.01); *Y02B 30/70* (2013.01)

(56) References Cited

U.S. PATENT DOCUMENTS

| | | |
|---|---|---|
| 4,942,613 A | 7/1990 | Lynch |
| 5,052,186 A | 10/1991 | Dudley et al. |
| 5,062,276 A | 11/1991 | Dudley |
| 5,082,173 A | 1/1992 | Poehlman et al. |
| 5,232,152 A | 8/1993 | Tsang |
| 5,364,026 A | 11/1994 | Kundert |
| 5,433,377 A | 7/1995 | Sodo et al. |
| 5,482,210 A | 1/1996 | Carey et al. |
| 5,547,107 A | 8/1996 | Boiardi |
| 5,797,729 A | 8/1998 | Rafuse et al. |
| 5,902,183 A | 5/1999 | D'Souza |
| 6,119,680 A | 9/2000 | Barritt |
| 6,121,885 A | 9/2000 | Masone et al. |
| 6,161,764 A | 12/2000 | Jatnieks |
| 6,164,374 A | 12/2000 | Rhodes et al. |
| 6,169,937 B1 | 1/2001 | Peterson |
| 6,227,961 B1 | 5/2001 | Moore et al. |
| 6,260,765 B1 | 7/2001 | Natale et al. |
| 6,314,750 B1 | 11/2001 | Ishikawa et al. |
| 6,318,639 B1 | 11/2001 | Toth |
| 6,351,693 B1 | 2/2002 | Monie et al. |
| 6,398,118 B1 | 6/2002 | Rosen et al. |
| 6,431,268 B1 | 8/2002 | Rudd |
| 6,435,418 B1 | 8/2002 | Toth et al. |
| 6,467,695 B1 | 10/2002 | Riley et al. |
| 6,478,233 B1 | 11/2002 | Shah |
| 6,487,869 B1 | 12/2002 | Sulc et al. |
| 6,514,138 B2 | 2/2003 | Estepp |
| 6,557,771 B2 | 5/2003 | Shah |
| 6,641,054 B2 | 11/2003 | Morey |
| 6,726,112 B1 | 4/2004 | Ho |
| 6,726,113 B2 | 4/2004 | Guo |
| 6,810,307 B1 | 10/2004 | Addy |
| 6,824,069 B2 | 11/2004 | Rosen |
| 6,851,621 B1 | 2/2005 | Wacker et al. |
| 6,874,691 B1 | 4/2005 | Hildebrand et al. |
| 6,888,441 B2 | 5/2005 | Carey |
| 6,912,429 B1 | 6/2005 | Bilger |
| 6,920,874 B1 | 7/2005 | Siegel |
| 6,935,570 B2 | 8/2005 | Acker, Jr. |
| 6,941,193 B2 | 9/2005 | Frecska et al. |
| 6,988,671 B2 | 1/2006 | DeLuca |
| 6,995,518 B2 | 2/2006 | Havlik et al. |
| 7,028,912 B1 | 4/2006 | Rosen |
| 7,044,397 B2 | 5/2006 | Bartlett et al. |
| 7,083,109 B2 | 8/2006 | Pouchak |
| 7,099,748 B2 | 8/2006 | Rayburn |
| 7,113,086 B2 | 9/2006 | Shorrock |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,222,494 B2 | 5/2007 | Peterson et al. |
| 7,225,054 B2 | 5/2007 | Amundson et al. |
| 7,226,496 B2 | 6/2007 | Ehlers |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,325,748 B2 | 2/2008 | Acker, Jr. |
| 7,331,187 B2 | 2/2008 | Kates |
| 7,343,751 B2 | 3/2008 | Kates |
| 7,383,158 B2 | 6/2008 | Krocker et al. |
| RE40,437 E | 7/2008 | Rosen |
| 7,402,780 B2 | 7/2008 | Mueller et al. |
| 7,434,413 B2 | 10/2008 | Wruck |
| 7,434,744 B2 | 10/2008 | Garozzo et al. |
| 7,442,012 B2 | 10/2008 | Moens |
| 7,469,550 B2 | 12/2008 | Chapman et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,592,713 B2 | 9/2009 | Bryan et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,758,408 B2 | 7/2010 | Hagentoft |
| 7,765,826 B2 | 8/2010 | Nichols |
| 7,774,102 B2 | 8/2010 | Butler et al. |
| 7,775,452 B2 | 8/2010 | Shah et al. |
| 7,784,291 B2 | 8/2010 | Butler et al. |
| 7,784,704 B2 | 8/2010 | Harter |
| 7,788,936 B2 | 9/2010 | Peterson et al. |
| 7,793,510 B2 | 9/2010 | Perry et al. |
| 7,798,418 B1 | 9/2010 | Rudd |
| 7,802,618 B2 | 9/2010 | Simon et al. |
| 7,832,221 B2 | 11/2010 | Wijaya et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 7,992,794 B2 | 8/2011 | Leen et al. |
| 8,010,237 B2 | 8/2011 | Cheung et al. |

(56) References Cited

U.S. PATENT DOCUMENTS

| | | |
|---|---|---|
| 8,032,254 B2 | 10/2011 | Amundson et al. |
| 8,078,326 B2 | 12/2011 | Harrod et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,091,796 B2 | 1/2012 | Amundson et al. |
| 8,099,195 B2 | 1/2012 | Imes et al. |
| 8,100,746 B2 | 1/2012 | Heidel et al. |
| 8,108,076 B2 | 1/2012 | Imes et al. |
| 8,131,506 B2 | 3/2012 | Steinberg et al. |
| 8,141,373 B2 | 3/2012 | Peterson et al. |
| 8,141,791 B2 | 3/2012 | Rosen |
| 8,165,721 B2 | 4/2012 | Petit |
| 8,167,216 B2 | 5/2012 | Schultz et al. |
| 8,180,492 B2 | 5/2012 | Steinberg |
| 8,185,244 B2 | 5/2012 | Wolfson |
| 8,190,296 B2 | 5/2012 | Alhilo |
| 8,190,367 B2 | 5/2012 | Bassa |
| 8,195,313 B1 | 6/2012 | Fadell et al. |
| 8,196,185 B2 | 6/2012 | Geadelmann et al. |
| 8,209,059 B2 | 6/2012 | Stockton |
| 8,214,085 B2 | 7/2012 | Boudreau et al. |
| 8,219,249 B2 | 7/2012 | Harrod et al. |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,280,556 B2 | 10/2012 | Besore et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,382 B2 | 4/2013 | Imes et al. |
| 8,412,488 B2 | 4/2013 | Steinberg et al. |
| 8,429,566 B2 | 4/2013 | Koushik et al. |
| 8,456,293 B1 | 6/2013 | Trundle et al. |
| 8,463,344 B2 | 6/2013 | Williams |
| 8,473,109 B1 | 6/2013 | Imes et al. |
| 8,476,964 B1 | 7/2013 | Atri |
| 8,489,243 B2 | 7/2013 | Fadell et al. |
| 8,498,749 B2 | 7/2013 | Imes et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,511,578 B2 | 8/2013 | Has |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,538,588 B2 | 9/2013 | Kasper |
| 8,543,244 B2 | 9/2013 | Keeling et al. |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,594,850 B1 | 11/2013 | Gourlay et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,620,841 B1 | 12/2013 | Filson et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,640,970 B2 | 2/2014 | Dorendorf |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,694,164 B2 | 4/2014 | Grohman et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,766,194 B2 | 7/2014 | Filson et al. |
| 8,768,521 B2 | 7/2014 | Amundson et al. |
| 8,770,490 B2 | 7/2014 | Drew |
| 8,770,491 B2 | 7/2014 | Warren et al. |
| 8,788,100 B2 | 7/2014 | Grohman et al. |
| 8,788,103 B2 | 7/2014 | Warren et al. |
| 8,802,981 B2 | 8/2014 | Wallaert et al. |
| 8,830,267 B2 | 9/2014 | Brackney |
| 8,838,282 B1 | 9/2014 | Ratliff et al. |
| 8,843,239 B2 | 9/2014 | Mighdoll et al. |
| 8,850,348 B2 | 9/2014 | Fadell et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,874,497 B2 | 10/2014 | Raestik et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,924,026 B2 | 12/2014 | Federspiel et al. |
| 8,939,827 B2 | 1/2015 | Boudreau et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,056,539 B2 | 6/2015 | Mirza et al. |
| 9,074,784 B2 | 7/2015 | Sullivan et al. |
| 9,075,419 B2 | 7/2015 | Sloo et al. |
| 9,077,055 B2 | 7/2015 | Yau |
| 9,080,782 B1 | 7/2015 | Sheikh |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |

(56) References Cited

U.S. PATENT DOCUMENTS

| | | |
|---|---|---|
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,285,802 B2 | 3/2016 | Arensmeier |
| 9,286,781 B2 | 3/2016 | Filson et al. |
| 9,291,358 B2 | 3/2016 | Federspiel et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,319,234 B2 | 4/2016 | Davis et al. |
| 9,353,965 B1 | 5/2016 | Goyal et al. |
| D763,707 S | 8/2016 | Sinha et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,589,459 B2 | 3/2017 | Davis et al. |
| 9,594,384 B2 | 3/2017 | Bergman et al. |
| 9,618,224 B2 | 4/2017 | Emmons et al. |
| D790,369 S | 6/2017 | Sinha et al. |
| 9,671,125 B2 | 6/2017 | Mowris et al. |
| 9,677,772 B2 | 6/2017 | Siegel et al. |
| 9,696,052 B2 | 7/2017 | Malchiondo et al. |
| 9,696,701 B2 | 7/2017 | Vasylyev |
| 9,762,408 B2 | 9/2017 | Davis et al. |
| 9,810,441 B2 | 11/2017 | Dean-Hendricks et al. |
| 9,857,238 B2 | 1/2018 | Malhotra et al. |
| 9,887,887 B2 | 2/2018 | Hunter et al. |
| D814,321 S | 4/2018 | Abdala et al. |
| 2001/0015281 A1 | 8/2001 | Schiedegger et al. |
| 2002/0123843 A1 | 9/2002 | Hood |
| 2003/0034897 A1 | 2/2003 | Shamoon et al. |
| 2003/0034898 A1 | 2/2003 | Shamoon et al. |
| 2003/0136853 A1 | 7/2003 | Morey |
| 2003/0177012 A1 | 9/2003 | Drennan |
| 2004/0074978 A1 | 4/2004 | Rosen |
| 2004/0125940 A1 | 7/2004 | Turcan et al. |
| 2004/0249479 A1 | 12/2004 | Shorrock |
| 2004/0262410 A1 | 12/2004 | Hull |
| 2005/0040943 A1 | 2/2005 | Winick |
| 2005/0083168 A1 | 4/2005 | Breitenbach |
| 2005/0119794 A1 | 6/2005 | Amundson et al. |
| 2005/0156049 A1 | 7/2005 | Van Ostrand et al. |
| 2005/0194456 A1 | 9/2005 | Tessier et al. |
| 2005/0195757 A1 | 9/2005 | Kidder et al. |
| 2005/0224069 A1 | 10/2005 | Patil et al. |
| 2005/0270151 A1 | 12/2005 | Winick |
| 2005/0270735 A1 | 12/2005 | Chen |
| 2006/0004492 A1 | 1/2006 | Terlson et al. |
| 2006/0038025 A1 | 2/2006 | Lee |
| 2006/0113398 A1 | 6/2006 | Ashworth |
| 2006/0192022 A1 | 8/2006 | Barton et al. |
| 2006/0213000 A1 | 9/2006 | Kimble et al. |
| 2006/0226970 A1 | 10/2006 | Saga et al. |
| 2006/0260334 A1 | 11/2006 | Carey et al. |
| 2006/0265489 A1 | 11/2006 | Moore |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0062513 A1 | 3/2007 | Gagas |
| 2007/0114295 A1 | 5/2007 | Jenkins |
| 2007/0198099 A9 | 8/2007 | Shah |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2007/0264927 A1 | 11/2007 | Choi et al. |
| 2008/0011863 A1 | 1/2008 | Roux et al. |
| 2008/0015740 A1 | 1/2008 | Osann, Jr. |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0102744 A1 | 5/2008 | Moore et al. |
| 2008/0120446 A1 | 5/2008 | Butler et al. |
| 2008/0161978 A1 | 7/2008 | Shah |
| 2008/0182506 A1 | 7/2008 | Jackson et al. |
| 2008/0216495 A1 | 9/2008 | Kates |
| 2008/0221714 A1 | 9/2008 | Schoettle |
| 2008/0223051 A1 | 9/2008 | Kates |
| 2008/0227430 A1 | 9/2008 | Polk |
| 2008/0280637 A1 | 11/2008 | Shaffer et al. |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0001179 A1 | 1/2009 | Dempsey |
| 2009/0122329 A1 | 5/2009 | Hegemier et al. |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0144015 A1 | 6/2009 | Bedard |
| 2009/0251422 A1 | 10/2009 | Wu et al. |
| 2009/0276096 A1 | 11/2009 | Proffitt et al. |
| 2010/0065245 A1* | 3/2010 | Imada ............... F24F 3/001 165/59 |
| 2010/0070092 A1 | 3/2010 | Winter et al. |
| 2010/0084482 A1 | 4/2010 | Kennedy et al. |
| 2010/0106334 A1 | 4/2010 | Grohman et al. |
| 2010/0107076 A1 | 4/2010 | Grohman et al. |
| 2010/0131884 A1 | 5/2010 | Shah |
| 2010/0145536 A1 | 6/2010 | Masters et al. |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0190479 A1 | 7/2010 | Scott et al. |
| 2010/0204834 A1 | 8/2010 | Comerford et al. |
| 2010/0212879 A1 | 8/2010 | Schnell et al. |
| 2010/0250707 A1 | 9/2010 | Dalley et al. |
| 2011/0006887 A1 | 1/2011 | Shaull et al. |
| 2011/0007017 A1 | 1/2011 | Wallaert |
| 2011/0010652 A1 | 1/2011 | Wallaert |
| 2011/0010653 A1 | 1/2011 | Wallaert et al. |
| 2011/0046798 A1 | 2/2011 | Imes et al. |
| 2011/0067851 A1 | 3/2011 | Terlson et al. |
| 2011/0087988 A1 | 4/2011 | Ray et al. |
| 2011/0088416 A1 | 4/2011 | Koethler |
| 2011/0128378 A1 | 6/2011 | Raji |
| 2011/0132991 A1 | 6/2011 | Moody et al. |
| 2011/0181412 A1 | 7/2011 | Alexander et al. |
| 2011/0209097 A1 | 8/2011 | Hinckley et al. |
| 2011/0223850 A1 | 9/2011 | Narayanamurthy et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0023428 A1 | 1/2012 | Kennard et al. |
| 2012/0028560 A1* | 2/2012 | Nikolic ............... F24F 7/013 454/239 |
| 2012/0029713 A1 | 2/2012 | Spicer et al. |
| 2012/0046859 A1 | 2/2012 | Imes et al. |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0123594 A1 | 5/2012 | Finch et al. |
| 2012/0126020 A1 | 5/2012 | Filson et al. |
| 2012/0126021 A1 | 5/2012 | Warren et al. |

(56) References Cited

U.S. PATENT DOCUMENTS

| | | |
|---|---|---|
| 2012/0131504 A1 | 5/2012 | Fadell et al. |
| 2012/0165993 A1 | 6/2012 | Whitehouse |
| 2012/0179727 A1 | 7/2012 | Esser |
| 2012/0181010 A1 | 7/2012 | Schultz et al. |
| 2012/0190294 A1 | 7/2012 | Heidel et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0245740 A1 | 9/2012 | Raestik et al. |
| 2012/0252345 A1 | 10/2012 | Wolfson |
| 2012/0252430 A1 | 10/2012 | Imes et al. |
| 2012/0259469 A1 | 10/2012 | Ward et al. |
| 2012/0259470 A1 | 10/2012 | Nijhawan et al. |
| 2012/0298763 A1 | 11/2012 | Young |
| 2012/0303165 A1 | 11/2012 | Qu et al. |
| 2012/0303828 A1 | 11/2012 | Young et al. |
| 2012/0310418 A1 | 12/2012 | Harrod et al. |
| 2012/0310708 A1 | 12/2012 | Curtis et al. |
| 2012/0315848 A1 | 12/2012 | Smith et al. |
| 2012/0316687 A1 | 12/2012 | Chen et al. |
| 2013/0002447 A1 | 1/2013 | Vogel et al. |
| 2013/0040550 A1 | 2/2013 | Pfister et al. |
| 2013/0054758 A1 | 2/2013 | Imes et al. |
| 2013/0057381 A1 | 3/2013 | Kandhasamy |
| 2013/0087628 A1 | 4/2013 | Nelson et al. |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158721 A1 | 6/2013 | Somasundaram et al. |
| 2013/0163300 A1 | 6/2013 | Zhao et al. |
| 2013/0180700 A1 | 7/2013 | Aycock |
| 2013/0190932 A1 | 7/2013 | Schuman |
| 2013/0190940 A1 | 7/2013 | Sloop et al. |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0226352 A1 | 8/2013 | Dean-Hendricks et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0081466 A1 | 3/2014 | Huapeng et al. |
| 2014/0099872 A1 | 4/2014 | Matsumoto et al. |
| 2014/0112331 A1 | 4/2014 | Rosen |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0130574 A1 | 5/2014 | Happ et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188287 A1 | 7/2014 | Sabata |
| 2014/0188288 A1 | 7/2014 | Fisher et al. |
| 2014/0191848 A1 | 7/2014 | Imes et al. |
| 2014/0202449 A1 | 7/2014 | Snyder |
| 2014/0207288 A1* | 7/2014 | Albrecht ............ F24F 11/0001 700/276 |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376405 A1 | 12/2014 | Erickson et al. |
| 2014/0376530 A1 | 12/2014 | Erickson et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0045976 A1 | 2/2015 | Li |
| 2015/0046162 A1 | 2/2015 | Aley-Raz et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |

(56) References Cited

U.S. PATENT DOCUMENTS

| | | |
|---|---|---|
| 2015/0081109 A1 | 3/2015 | Fadell et al. |
| 2015/0081568 A1 | 3/2015 | Land, III |
| 2015/0082225 A1 | 3/2015 | Shearer |
| 2015/0088272 A1 | 3/2015 | Drew |
| 2015/0088318 A1 | 3/2015 | Amundson et al. |
| 2015/0088442 A1 | 3/2015 | Farrar et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0245189 A1 | 8/2015 | Nalluri et al. |
| 2015/0248118 A1 | 9/2015 | Li et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiiuliis et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0345819 A1 | 12/2015 | Ostrovsky et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0369503 A1 | 12/2015 | Flaherty et al. |
| 2015/0369507 A1 | 12/2015 | Flaherty et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069580 A1 | 3/2016 | Crisa |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0107820 A1 | 4/2016 | MacVittie et al. |
| 2016/0116177 A1 | 4/2016 | Sikora et al. |
| 2016/0116181 A1 | 4/2016 | Aultman et al. |
| 2016/0138819 A1 | 5/2016 | Vega |
| 2016/0171289 A1 | 6/2016 | Lee et al. |
| 2016/0180663 A1 | 6/2016 | McMahan et al. |
| 2016/0223216 A1 | 8/2016 | Buda et al. |
| 2016/0231014 A1 | 8/2016 | Ro et al. |
| 2016/0249437 A1 | 8/2016 | Sun et al. |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0377298 A1 | 12/2016 | Livchak et al. |
| 2016/0377306 A1 | 12/2016 | Drees et al. |
| 2017/0041454 A1 | 2/2017 | Nicholls et al. |
| 2017/0052545 A1 | 2/2017 | Cortez |
| 2017/0059197 A1 | 3/2017 | Goyal et al. |
| 2017/0067239 A1 | 3/2017 | Dorendorf et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0102723 A1 | 4/2017 | Smith et al. |

(56) References Cited

U.S. PATENT DOCUMENTS

| | | | |
|---|---|---|---|
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2017/0122613 A1 | 5/2017 | Sinha et al. | |
| 2017/0122617 A1 | 5/2017 | Sinha et al. | |
| 2017/0123391 A1 | 5/2017 | Sinha et al. | |
| 2017/0124838 A1 | 5/2017 | Sinha et al. | |
| 2017/0124842 A1 | 5/2017 | Sinha et al. | |
| 2017/0130981 A1 | 5/2017 | Willette et al. | |
| 2017/0131825 A1 | 5/2017 | Moore et al. | |
| 2017/0136206 A1 | 5/2017 | Pillai et al. | |
| 2017/0139386 A1 | 5/2017 | Pillai et al. | |
| 2017/0159954 A1 | 6/2017 | Bergman et al. | |
| 2017/0176030 A1 | 6/2017 | Emmons et al. | |
| 2017/0192402 A1 | 7/2017 | Karp et al. | |
| 2017/0263111 A1 | 9/2017 | Deluliis et al. | |
| 2017/0292731 A1 | 10/2017 | Matsuoka et al. | |
| 2017/0295058 A1 | 10/2017 | Gottschalk et al. | |
| 2017/0357607 A1 | 12/2017 | Cayemberg et al. | |
| 2018/0023833 A1 | 1/2018 | Matsuoka et al. | |
| 2018/0087795 A1 | 3/2018 | Okita et al. | |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| CN | 102119507 | 7/2011 |
| CN | 104020726 | 9/2014 |
| DE | 10 2004 005 962 | 8/2005 |
| EP | 2 283 279 A2 | 2/2011 |
| EP | 2 738 478 A2 | 6/2014 |
| EP | 2 897 018 A1 | 7/2015 |
| EP | 2 988 188 A2 | 2/2016 |
| GB | 2 519 441 A | 4/2015 |
| JP | H10-276483 A | 10/1998 |
| JP | 2007-218499 A | 8/2007 |
| JP | 2011-014516 A | 1/2011 |
| JP | H09-126523 A | 1/2011 |
| WO | WO-95/28606 A1 | 10/1995 |
| WO | WO-00/22491 A1 | 4/2000 |
| WO | WO-2006/041599 A9 | 7/2006 |
| WO | WO-2009/006133 A1 | 1/2009 |
| WO | WO-2009/036764 A3 | 3/2009 |
| WO | WO-2009/058127 A1 | 5/2009 |
| WO | WO-2010/059143 A1 | 5/2010 |
| WO | WO-2010/078459 A1 | 7/2010 |
| WO | WO-2010/088663 A1 | 8/2010 |
| WO | WO-2012/016213 A1 | 2/2012 |
| WO | WO 2017/031688 | 3/2012 |
| WO | WO-2012/042232 | 4/2012 |
| WO | WO 2012/047938 | 4/2012 |
| WO | WO-2012/068436 A1 | 5/2012 |
| WO | WO-2012/068437 A3 | 5/2012 |
| WO | WO-2012/068459 A3 | 5/2012 |
| WO | WO-2012/068495 A1 | 5/2012 |
| WO | WO-2012/068503 A1 | 5/2012 |
| WO | WO-2012/068507 A3 | 5/2012 |
| WO | WO-2012/068517 A1 | 5/2012 |
| WO | WO-2012/068526 A1 | 5/2012 |
| WO | WO-2012/142477 A3 | 10/2012 |
| WO | WO-2013/033469 A1 | 3/2013 |
| WO | WO-2013/052389 A1 | 4/2013 |
| WO | WO-2013/052901 A3 | 4/2013 |
| WO | WO-2013/052905 A1 | 4/2013 |
| WO | WO-2013/058932 | 4/2013 |
| WO | WO-2013/058933 A1 | 4/2013 |
| WO | WO-2013/058934 | 4/2013 |
| WO | WO-2013/058968 A1 | 4/2013 |
| WO | WO-2013/058969 A1 | 4/2013 |
| WO | WO-2013/059684 A1 | 4/2013 |
| WO | WO-2013/153480 A3 | 10/2013 |
| WO | WO-2014/047501 A1 | 3/2014 |
| WO | WO-2014/051632 A1 | 4/2014 |
| WO | WO-2014/051635 A1 | 4/2014 |
| WO | WO-2014/055059 A1 | 4/2014 |
| WO | WO-2014/152301 A2 | 9/2014 |
| WO | WO-2014/152301 A3 | 9/2014 |
| WO | WO-2015/012449 A1 | 1/2015 |
| WO | WO-2015/039178 A1 | 3/2015 |
| WO | WO-2015/054272 A2 | 4/2015 |
| WO | WO-2015/057698 A1 | 4/2015 |
| WO | WO-2015/099721 A1 | 7/2015 |
| WO | WO-2015/127499 A1 | 9/2015 |
| WO | WO-2015/127566 A1 | 9/2015 |
| WO | WO-2015/134755 A3 | 9/2015 |
| WO | WO-2015/195772 A1 | 12/2015 |
| WO | WO-2016/038374 A1 | 3/2016 |
| WO | WO-2017/044903 A1 | 3/2017 |

OTHER PUBLICATIONS

U.S. Appl. No. 14/543,354, filed Nov. 17, 2014, VIVINT, Inc.
U.S. Appl. No. 15/143,373, filed Apr. 29, 2016, Johnson Controls Technology Company.
U.S. Appl. No. 15/146,134, filed May 4, 2016, Johnson Controls Technology Company.
U.S. Appl. No. 15/146,202, filed May 4, 2016, Johnson Controls Technology Company.
U.S. Appl. No. 15/146,649, filed May 4, 2016, Johnson Controls Technology Company.
U.S. Appl. No. 15/146,749, filed May 4, 2016, Johnson Controls Technology Company.
U.S. Appl. No. 15/146,763, filed May 4, 2016, Johnson Controls Technology Company.
U.S. Appl. No. 15/179,894, filed Jun. 10, 2016, Johnson Controls Technology Company.
U.S. Appl. No. 15/207,431, filed Jul. 11, 2016, Johnson Controls Technology Company.
U.S. Appl. No. 15/247,777, filed Aug. 25, 2016, Johnson Controls Technology Company.
U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, dated Aug. 25, 2016, Johnson Controls Technology Company.
U.S. Appl. No. 15/247,881, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.

(56) References Cited

OTHER PUBLICATIONS

U.S. Appl. No. 15/247,886, filed Aug. 25, 2016, Johnson Controls Technology Company.
U.S. Appl. No. 15/260,293, filed Sep. 8, 2016, Johnson Controls Technology Company.
U.S. Appl. No. 15/260,295, filed Sep. 8, 2016, Johnson Controls Technology Company.
U.S. Appl. No. 15/260,297, filed Sep. 8, 2016, Johnson Controls Technology Company.
U.S. Appl. No. 15/260,299, filed Sep. 8, 2016, Johnson Controls Technology Company.
U.S. Appl. No. 15/260,301, filed Sep. 8, 2016, Johnson Controls Technology Company.
U.S. Appl. No. 15/336,789, filed Oct. 28, 2016, Johnson Controls Technology Company.
U.S. Appl. No. 15/336,791, filed Oct. 28, 2016, Johnson Controls Technology Company.
U.S. Appl. No. 15/336,792, filed Oct. 28, 2016, Johnson Controls Technology Company.
U.S. Appl. No. 15/336,793, filed Oct. 28, 2016, Johnson Controls Technology Company.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
U.S. Appl. No. 15/397,722, filed Jan. 3, 2017, Johnson Controls Technology Company.
U.S. Appl. No. 29/525,907, filed May 4, 2015, Johnson Controls Technology Company.
U.S. Appl. No. 29/548,334, filed Dec. 11, 2015, Johnson Controls Technology Company.
U.S. Appl. No. 29/563,447, filed May 4, 2016, Johnson Controls Technology Company.
U.S. Appl. No. 29/576,515, filed Sep. 2, 2016, Johnson Controls Technology Company.
U.S. Appl. No. 62/217,788, filed Sep. 11, 2015, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
Cuevas et al., Integrating Gesture-Based Identification in Context-Aware Applications: A System Approach, 2014, 8 pages.
Examination Report for Australian Application No. 2016257459, dated May 4, 2018, 3 pages.
First Examination Report for New Zealand Application No. 737432, dated Jun. 11, 2018, 6 pages.
First Examination Report for New Zealand Application No. 737663, dated Jun. 11, 2018, 3 pages.
Hayashi et al., "Wave to Me: Human Factors in Computing Systems", ACM, 2 Penn Plaza, Suite 701 New York, NY 10121-0701 USA, Apr. 26, 2014, pp. 3453-3462.
International Search Report and Written Opinion for Application No. PCT/US2016/030291, dated Sep. 7, 2016, 11 pages.
International Search Report and Written Opinion for Application No. PCT/US2016/030827, dated Sep. 7, 2016, 13 pages.
International Search Report and Written Opinion for Application No. PCT/US2016/030829, dated Sep. 7, 2016, 15 pages.
International Search Report and Written Opinion for Application No. PCT/US2016/030835, dated Sep. 7, 2016, 13 pages.
International Search Report and Written Opinion for Application No. PCT/US2016/030836, dated Sep. 7, 2016, 11 pages.
International Search Report and Written Opinion for Application No. PCT/US2016/030837, dated Sep. 7, 2016, 13 pages.
International Search Report and Written Opinion for Application No. PCT/US2016/051176, dated Feb. 16, 2017, 20 pages.
International Search Report and Written Opinion for Application No. PCT/US2017/012217, dated Mar. 31, 2017, 14 pages.
International Search Report and Written Opinion for Application No. PCT/US2017/012218, dated Mar. 31, 2017, 14 pages.
International Search Report and Written Opinion for Application No. PCT/US2017/012221, dated Mar. 31, 2017, 13 pages.
International Search Report and Written Opinion for Application No. PCT/US2017/030890, dated Jun. 21, 2017, 13 pages.
International Search Report and Written Opinion for Application No. PCT/US2017/054915, dated Jan. 16, 2018, 14 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Written Opinion for Singapore Application No. 11201708996V, dated Dec. 27, 2017, 6 pages.
Written Opinion for Singapore Application No. 11201708997W, dated Jan. 10, 2018, 9 pages.
Written Opinion for Singapore Application No. 11201709002Y, dated Feb. 7, 2018, 5 pages.
Office Action on EP 16723885.6, dated Sep. 17, 2018, 7 pages.
Office Action on JP 2017-557196, dated Jan. 29, 2019, 11 pages, with English translation.
Office Action on NZ 737432, dated Jan. 31, 2019, 5 pages.
Second Written Opinion for Singapore Application No. 11201708997W, dated Dec. 6, 2018, 6 pages.

\* cited by examiner

THERMOSTAT WITH EXHAUST FAN CONTROL FOR AIR QUALITY AND HUMIDITY CONTROL

CROSS-REFERENCE TO RELATED PATENT APPLICATIONS

This application claims the benefit of and priority to U.S. Provisional Patent Application No. 62/485,784 filed Apr. 14, 2017, the entire disclosure of which is incorporated by reference herein.

BACKGROUND

The present invention relates generally to thermostats and more particularly to the improved control of a building or space's heating, ventilating, and air conditioning (HVAC) system through the use of exhaust fans within a building to improve and control air quality and humidity of the building.

A thermostat is, in general, a component of an HVAC control system. Traditional thermostats sense the temperature of a system and control components of the HVAC system in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature of a building or space, a user adjusts the setpoint via the thermostat's user interface.

SUMMARY

One implementation of the present disclosure is a heating, ventilation, and air conditioning (HVAC) system for controlling air quality of a building space. The system includes an air quality sensor configured to sense the air quality of the building space, an exhaust fan configured to exhaust air from inside the building space to outside the building space, and a switch device configured to control the exhaust fan to exhaust the air from inside the building space to outside the building space. The system includes a controller including a processing circuit communicably coupled to the switch device. The processing circuit is configured to determine an air quality level of the building space based on the air quality sensed by the air quality sensor, determine whether the air quality level is less than an air quality threshold, and cause the switch device to operate the exhaust fan to exhaust air from inside the building space to outside the building space in response to a determination that the air quality level is less than the air quality threshold.

In some embodiments, the processing circuit of the controller is configured to cause the switch device to operate the exhaust fan to exhaust air from inside the building space to outside the building space for a predefined length of time during a particular time period and cause the switch device to not operate the exhaust fan to exhaust air from inside the building space to outside the building space for a total amount of the predefined length of time in response to a determination that the air quality level is greater than the air quality threshold.

In some embodiments, the system includes a supply fan configured to supply air from outside the building space to inside the building space. In some embodiments, the processing circuit of the controller is configured to cause the supply fan to supply the air from outside the building space to inside the building space in response to the determination that the air quality level is below the air quality threshold.

In some embodiments, the processing circuit of the controller is configured to determine a runtime of the exhaust fan, the runtime is a length of time that the exhaust fan has run during a particular time period, determine whether the runtime of the exhaust fan is greater than, equal to, or less than a predefined runtime, cause the switch device to operate the exhaust fan to exhaust the air from inside the building space to outside the building space in response to the determination that the air quality level is less than the air quality threshold and a determination that the runtime of the exhaust fan is less than the predefined runtime, and cause the switch device to not operate the exhaust fan to exhaust the air from inside the building space to outside the building space in response to the determination that the air quality level is below the air quality threshold and a determination that the runtime of the exhaust fan is greater than or equal to the predefined runtime.

In some embodiments, the processing circuit of the controller is configured to receive or determine an outdoor air quality level, determine whether the outdoor air quality level is less than an outdoor air quality threshold, cause the switch device to operate the exhaust fan to exhaust air from inside the building space to outside the building space in response to the determination that the air quality level is less than the air quality threshold and a determination that the outdoor air quality level is greater than the outdoor air quality threshold, and cause the switch device to not operate the exhaust fan to exhaust the air from inside the building space to outside the building space in response to the determination that the air quality level is less than the air quality threshold and a determination that the outdoor air quality level is less than the outdoor air quality threshold.

In some embodiments, the air quality level is based on at least one of a humidity level, a temperature level, a carbon dioxide concentration level, and a volatile organic compound (VOC) concentration level. In some embodiments, the processing circuit is configured to determine whether the air quality level is less than the air quality threshold by determining that the at least of the humidity level, the temperature level, the carbon dioxide ($CO_2$) concentration level, and the VOC concentration level is greater than a particular threshold.

In some embodiments, the system includes a multiple air quality sensors including the air quality sensor and one or more other air quality sensors. In some embodiments, the air quality sensors include two or more of a humidity sensor, a temperature sensor, a $CO_2$ sensor, and a VOC sensor.

In some embodiments, the processing circuit of the controller is configured to determine whether an outdoor air temperature (OAT) is less than a predefined OAT threshold and an indoor air humidity (IAH) level is greater than an IAH setpoint and cause the switch device to operate the exhaust fan to exhaust the air from inside the building space to outside the building space in response to the determination that the air quality level is below the air quality threshold and a determination that the OAT is less than the predefined OAT threshold and the IAH level is greater than the IAH setpoint.

In some embodiments, the processing circuit of the controller is configured to operate the exhaust fan to exhaust the air from inside the building space to outside the building space in response to one or more heating or cooling devices associated with the building space being in operation to cause the building space to be heated or cooled. In some embodiments, the controller is a thermostat, wherein the processing circuit of the thermostat is configured to control the one or more heating or cooling devices associated with the building space to heat or cool the building space.

In some embodiments, the system includes a second air quality sensor configured to sense a second air quality associated with a sub-portion of the building space, wherein the exhaust fan is located within the sub-portion of the building space. In some embodiments, the switch device is configured to determine a second air quality level associated with the sub-portion of the building space based on the second air quality sensor and control the sub-portion of the building space by controlling the exhaust fan to exhaust air from inside the sub-portion of the building space to outside the sub-portion of the building space based on the second air quality level.

In some embodiments, the switch device is configured to determine whether the second air quality value is below a second air quality threshold and control the sub-portion of the building space by controlling the exhaust fan to exhaust the air from inside the sub-portion of the building space to outside the sub-portion of the building space in response to a determination that the second air quality value is below the second air quality threshold.

In some embodiments, the system includes a supply fan configured to supply air from outside the building space to inside the building space. In some embodiments, the switch device is configured to provide an indication to control the supply fan to the controller in response to the determination that the second air quality value is below the second air quality threshold. In some embodiments, the processing circuit of the controller is configured to receive the indication to control the supply fan from the switch device and control the supply fan to supply air from outside the building space to inside the building space in response to receiving the indication to control the supply fan from the control circuit of the switch.

In some embodiments, the second air quality sensor is a humidity sensor configured to sense a humidity of the sub-portion of the building space. In some embodiments, the switch device is configured to determine a humidity level of the sub-portion of the building space based on the humidity sensed by the humidity sensor and control the sub-portion of the building space by controlling the exhaust fan to exhaust the air from inside the sub-portion of the building space to outside the sub-portion of the building space based on the humidity level.

In some embodiments, the switch device is configured to control the sub-portion of the building space by controlling the exhaust fan to exhaust the air from inside the sub-portion of the building space to outside the sub-portion of the building space in response to a determination that the humidity level is greater than a predefined humidity threshold.

In some embodiments, the air quality sensor is located within a sub-portion of the building space and the exhaust fan is located within the sub-portion of the building space. In some embodiments, the air quality sensed by the air quality sensors is an air quality associated with the sub-portion of the building space. In some embodiments, the switch device is configured to determine a second air quality level associated with the sub-portion of the building space based on the air quality associated with the sub-portion of the building space sensed by the air quality sensor and control the sub-portion of the building space by controlling the exhaust fan to exhaust air from inside the sub-portion of the building space to outside the sub-portion of the building space based on the second air quality level.

In some embodiments, the system includes a supply fan configured to circulate air within the building space and an air inlet configured to allow air from outside the building space to enter the building space. In some embodiments, the supply fan circulating the air within the building space and the exhaust fan exhausting the air from inside the building space to outside the building space causes the air from outside the building space to enter the building space via the air inlet. In some embodiments, the processing circuit of the controller is configured to cause the supply fan to circulate the air within the building space in response to the determination that the air quality level is below the air quality threshold.

In some embodiments, the exhaust fan is configured to exhaust the air from inside the building space to outside the building space causing air outside the building space to enter the building space. In some embodiments, the processing circuit of the controller is configured to determine whether the air outside the building space is dry by determining whether an outdoor air temperature (OAT) is less than a predefined OAT threshold and cause the switch device to operate the exhaust fan to exhaust the air from inside the building space to outside the building space causing the air outside the building space to enter the building space causing the building space to be dehumidified in response to a determination that the OAT is less than the predefined OAT threshold.

Another implementation of the present disclosure is a method for controlling air quality of a building space. The method includes determining, by a controller, an air quality level of the building space based on the air quality sensed by an air quality sensor, determining, by the controller, whether the air quality level is less than an air quality threshold, and causing, by the controller, a switch device to operate the exhaust fan to exhaust air from inside the building space to outside the building space in response to a determination that the air quality level is less than the air quality threshold.

In some embodiments, the method includes receiving or determining, by the controller, an outdoor air quality level, determining, by the controller, whether the outdoor air quality level is less than or greater than an outdoor air quality threshold, and causing, by the controller, a switch device to operate the exhaust fan to exhaust air from inside the building space to outside the building space in response to a determination that the air quality level is less than the air quality threshold and a determination that the outdoor air quality level is greater than the outdoor air quality threshold. In some embodiments, the method includes causing, by the controller, the switch device to not operate the exhaust fan to exhaust the air from inside the building space to outside the building space in response to the determination that the air quality level is less than the air quality threshold and a determination that the outdoor air quality level is less than the outdoor air quality threshold. In some embodiments, the method includes causing, by the controller, a supply fan of the building space to supply air from outside the building space to inside the building space in response to the determination that the air quality level is less than the air quality threshold and the determination that the outdoor air quality level is greater than the outdoor air quality threshold and causing, by the controller, the supply fan to not supply air from outside the building space to inside the building space in response to the determination that the air quality level is less than the air quality threshold and the determination that the outdoor air quality level is less than the outdoor air quality threshold.

In some embodiments, the exhaust fan is located within the sub-portion of the building space. In some embodiments, the method includes determining, by the switch device, a second air quality level associated with a sub-portion of the building space based on a second air quality sensor and controlling, by the switch device, the sub-portion of the building space by controlling the exhaust fan to exhaust air from inside the sub-portion of the building space to outside the sub-portion of the building space based on the second air quality level.

In some embodiments, the method includes causing, by the controller, a supply fan of the building space to supply air from outside the building space to inside the building space in response to the determination that the air quality level is less than the air quality threshold and the determination that the outdoor air quality level is greater than the outdoor air quality threshold and causing, by the controller, the supply fan to not supply air from outside the building space to inside the building space in response to the determination that the air quality level is less than the air quality threshold and the determination that the outdoor air quality level is less than the outdoor air quality threshold.

In some embodiments, the method includes providing, by the switch device, an indication to control the supply fan to the controller in response to the determination that the second air quality value is below the second air quality threshold, the supply fan configured to supply air from outside the building space to inside the building space, receiving, by the controller, the indication to control the supply fan from the switch device, and controlling, by the controller, the supply fan to supply air from outside the building space to inside the building space in response to receiving the indication to control the supply fan from the control circuit of the switch.

Another implementation of the present disclosure is a controller for controlling air quality of a building space. The controller includes an air quality sensor configured to sense the air quality of the building space and a processing. The processing circuit is configured to determine an air quality level of the building space based on the air quality sensed by the air quality sensor, determine whether the air quality level is less than an air quality threshold, cause a switch device of the building space to operate an exhaust fan to exhaust air from inside the building space to outside the building space in response to a determination that the air quality level is less than the air quality threshold, and cause a supply fan of the building space to supply air from outside the building space to inside the building space in response to the determination that the air quality level is below the air quality threshold, wherein the supply fan configured to supply air from outside the building space to inside the building space.

In some embodiments, the processing circuit is configured to receive or determine an outdoor air quality level, determine whether the outdoor air quality level is less than an outdoor air quality threshold, cause the switch device to operate the exhaust fan to exhaust air from inside the building space to outside the building space and cause the supply fan of the building space to supply air from outside the building space to inside the building space in response to the determination that the air quality level is less than the air quality threshold and a determination that the outdoor air quality level is greater than the outdoor air quality threshold, and cause the switch device to not operate the exhaust fan to exhaust the air from inside the building space to outside the building space cause the supply fan of the building space to not supply air from outside the building space to inside the building space in response to the determination that the air quality level is less than the air quality threshold and a determination that the outdoor air quality level is less than the outdoor air quality threshold.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
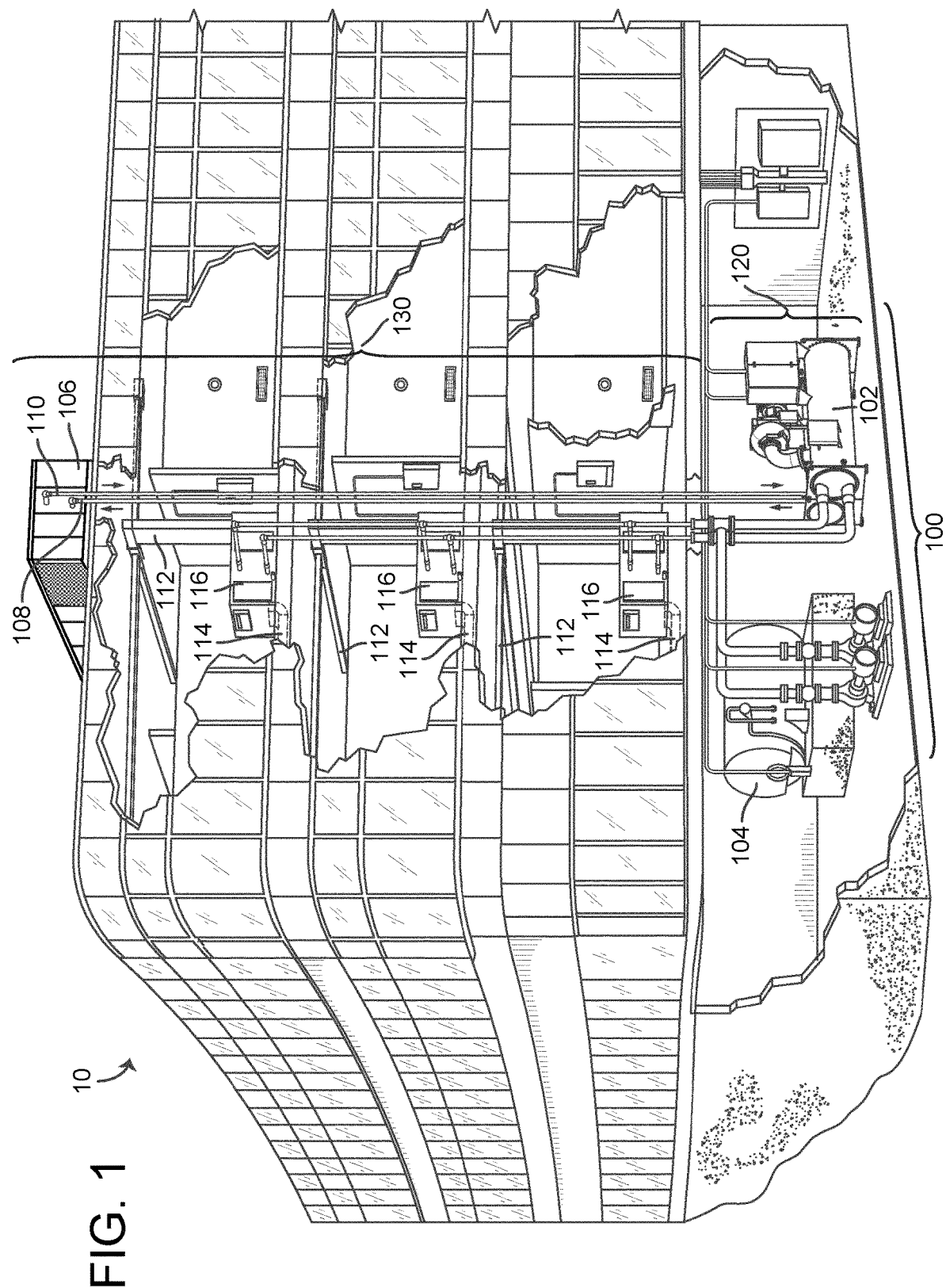
FIG. 1 is a drawing of a building equipped with a HVAC system, according to an exemplary embodiment.

Referring generally to the FIGURES, a user control device is shown, according to various exemplary embodiments. The user control device can be a thermostat used in any HVAC system, room, environment, or system within which it is desired to control and/or observe environmental conditions (e.g., temperature, humidity, air quality, etc.). The thermostat may be a device adjusted by a user and configured to control building equipment to control an environmental condition (e.g., temperature) of a system.

The thermostat can collect data about a space and the occupants of the space with various sensors (e.g., temperature sensors, humidity sensors, acoustic sensors, optical sensors, gas and other chemical sensors, biometric sensors, motion sensors, etc.) and user inputs. The thermostat may utilize data collected from a single room, multiple rooms, an entire building, and/or multiple buildings to control the air quality of the rooms and/or buildings. The data may be analyzed by the thermostat to control one or more components within the building associated with the HVAC system, e.g., supply fans and/or exhaust fans.

A fresh air inlet of a building for brining fresh air into the building can be supplemented using an exhaust fan. The thermostat can communicate with and/or control the exhaust fan. The exhaust fan may be a specially installed exhaust fans or using an existing exhaust fan of the building. A user may install a remotely-controllable switch device on each of the exhaust fans (e.g., a bathroom exhaust fan, a laundry room exhaust fan, a cooking vent, etc.), the switch device communicably coupled to the thermostat. The switch device may be a "smart switch" that can communicate with sensors for receiving temperature, humidity, air quality, and other sensed parameters within the home. The "smart switch" can control the exhaust fans based on data it gathers, communicate control commands to the thermostat, and/or receive control commands from the thermostat. The thermostat can control the exhaust fans via the switch devices to maintain a healthy air quality and/or humidity level within the building.

In some embodiments, the thermostat can improve internal air quality by controlling a fresh air intake based on an indoor air quality, e.g., by running a supply fan. For example, some buildings may have an outdoor air intake connected to a return air duct feeding a furnace and/or air handler of the building. While this can allow some fresh air to come into the building, there may be lack of negative pressure in the building to force fresh air into the building to maintain a pressure equalization. In this regard, the thermostat can run the exhaust fans causing a negative pressure within the building, thus maintaining the pressure equalization.

The thermostat and/or the switch device can control indoor air quality and/or normal HVAC equipment operation (e.g., building heating, building cooling, etc.). For example, the thermostat and/or the switch device can control indoor air quality of the building by operating exhaust fans in conjunction with the normal operation of the HVAC equipment. Also, the thermostat and/or switch device can control indoor air quality of a particular space of the building by operating exhaust fans in conjunction with, or independent of, the normal operation of the HVAC equipment.

The supply fan controlled by the thermostat can pull air from outside the building into the building and/or circulate air within the building. The building may include an air inlet allowing air from outside the building into a return air path of the supply fan. The thermostat can negatively pressure the building by turning on the exhaust fan and/or by running the supply fan. This can cause a ventilation effect in the building where more outdoor air is forced into the building.

Furthermore, the thermostat can dehumidify the building by controlling the exhaust fan and/or the supply fan. The thermostat can pull fresh dry air from outside the building (e.g., in cold and/or fall winter months) to dehumidify the building (e.g., ventilation of the building). The thermostat can be configured to use indoor air humidity and/or outdoor air temperature to determine whether the air outside the building is dry enough to dehumidify the building (e.g., based on max moisture content for a given outdoor temperature) and/or whether the building requires dehumidification. This functionality can allow the thermostat to dehumidify the building in cold months by running the exhaust fan and/or supply air fan in cold months when the outdoor conditions are sufficient to reduce the humidity of the building.

Building Management System and HVAC System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a multiple HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
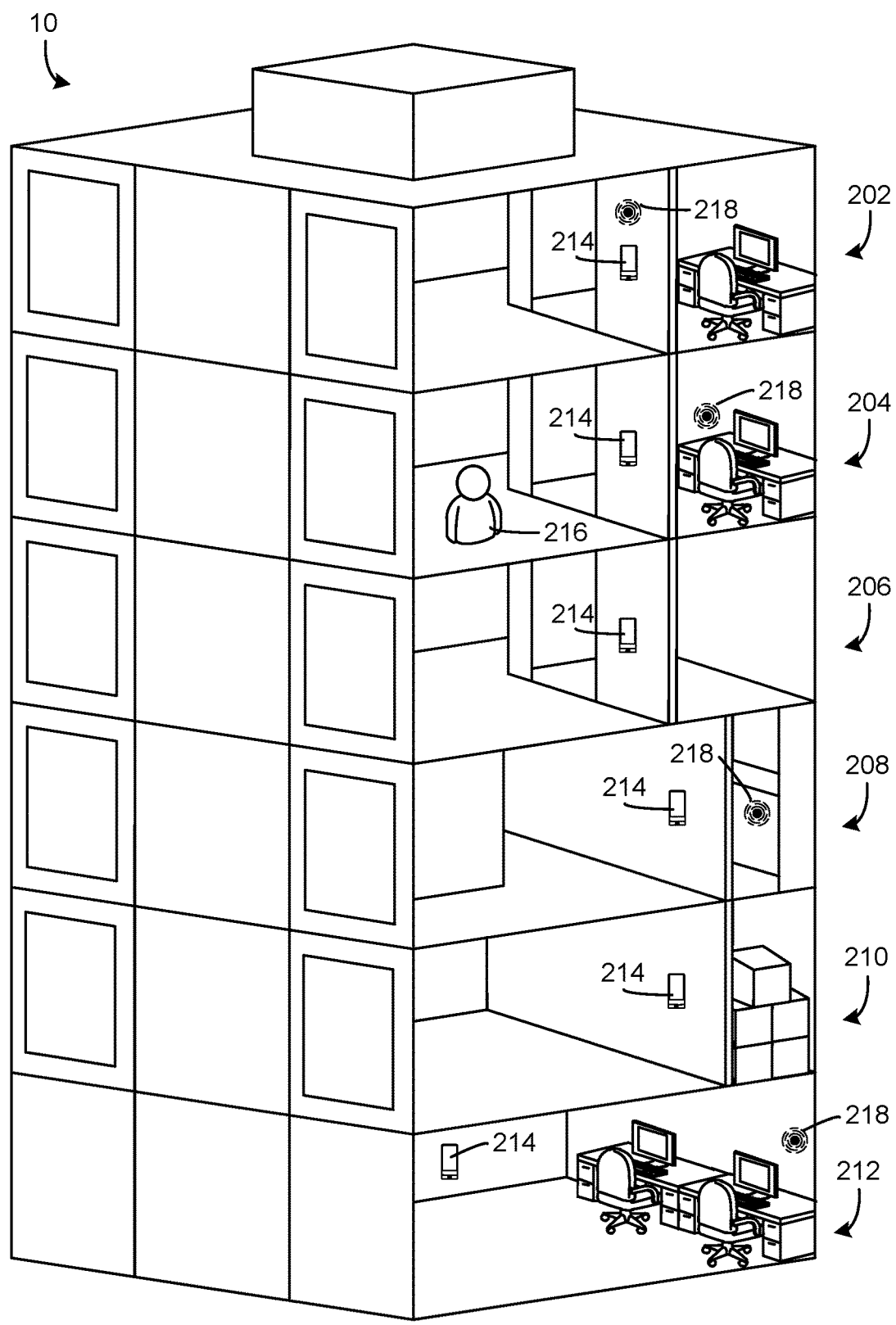
FIG. 2 is a drawing of multiple zones and floors of the building of FIG. 1 equipped with control devices, according to an exemplary embodiment.

Referring now to FIG. 2, building 10 is shown in greater detail, according to an exemplary embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heart-rates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine what zone the occupant is in. In some embodiments, control device 214 causes temperature setpoints, music and/or other control actions to follow occupant 216 as the occupant 216 moves from one zone to another zone (i.e., from one floor to another floor).

In some embodiments, display devices 214 are connected to a building management system, a weather server, and/or a building emergency sensor(s). In some embodiments, display devices 214 may receive emergency notifications from the building management system, the weather server, and/or the building emergency sensor(s). Based on the nature of the emergency, display devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If the display devices 214 determine that there are high winds around building 10, the control device 214 may direct occupants of zones 202-210 to zone 212 if zone 212 has no windows.

Figure 3:
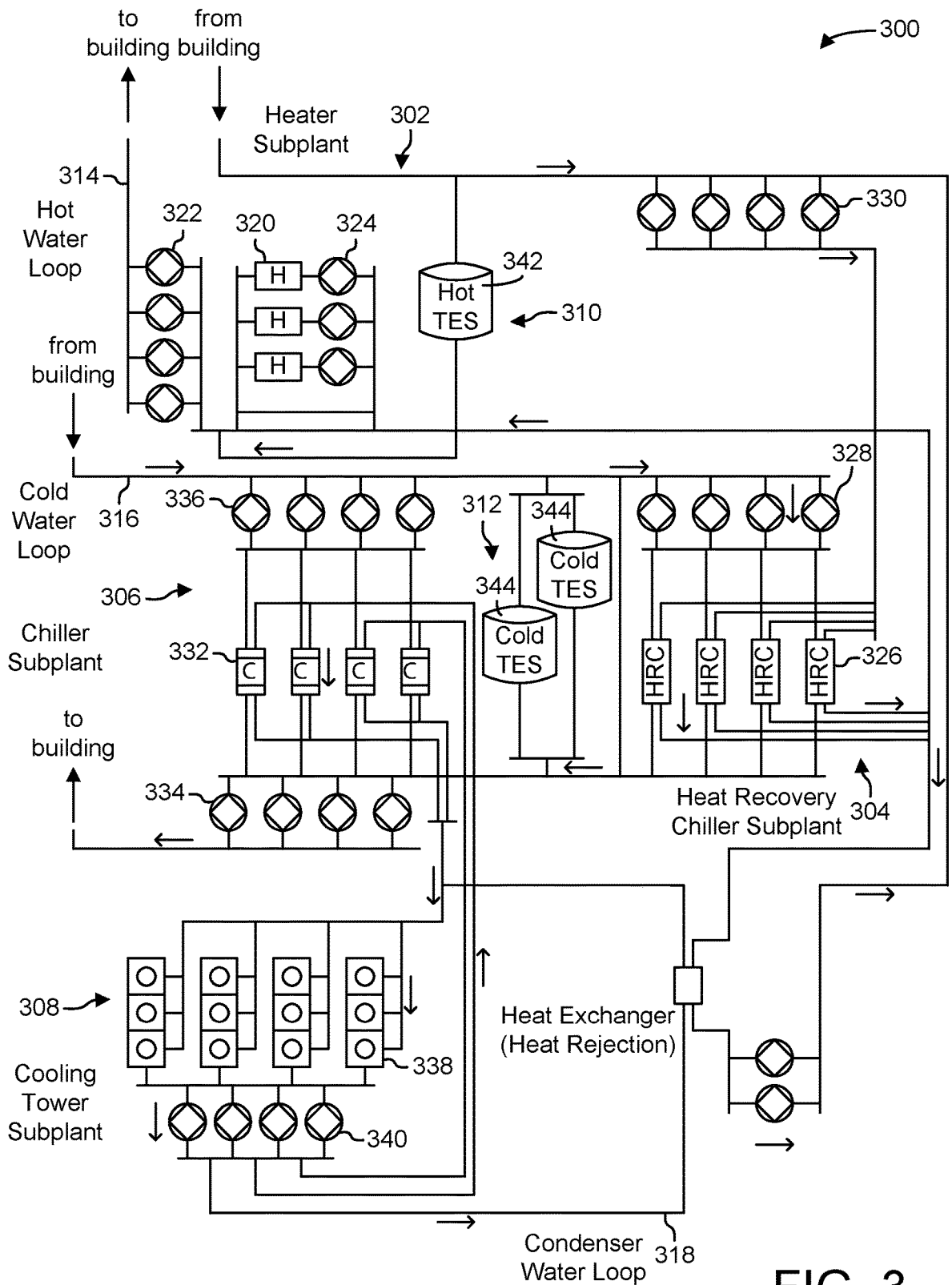
FIG. 3 is a block diagram of a waterside system that may be used in conjunction with the building of FIGS. 1-2, according to an exemplary embodiment.

Referring now to FIG. 3, a block diagram of a waterside system 300 is shown, according to an exemplary embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in the cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
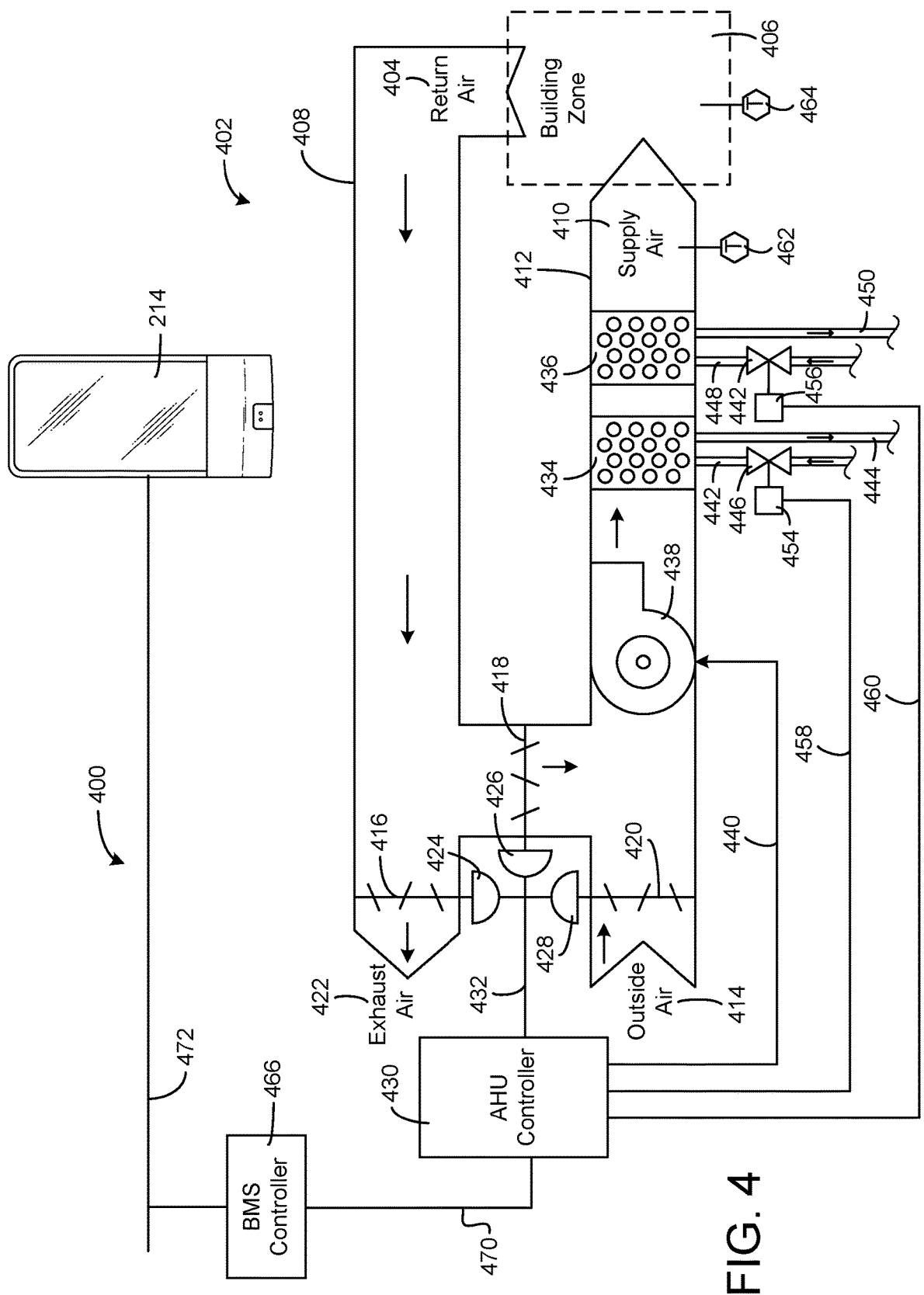
FIG. 4 is a block diagram of an airside system that may be used in conjunction with the building of FIGS. 1-2, according to an exemplary embodiment.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 106 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 412. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU 402 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472.

Figure 5:
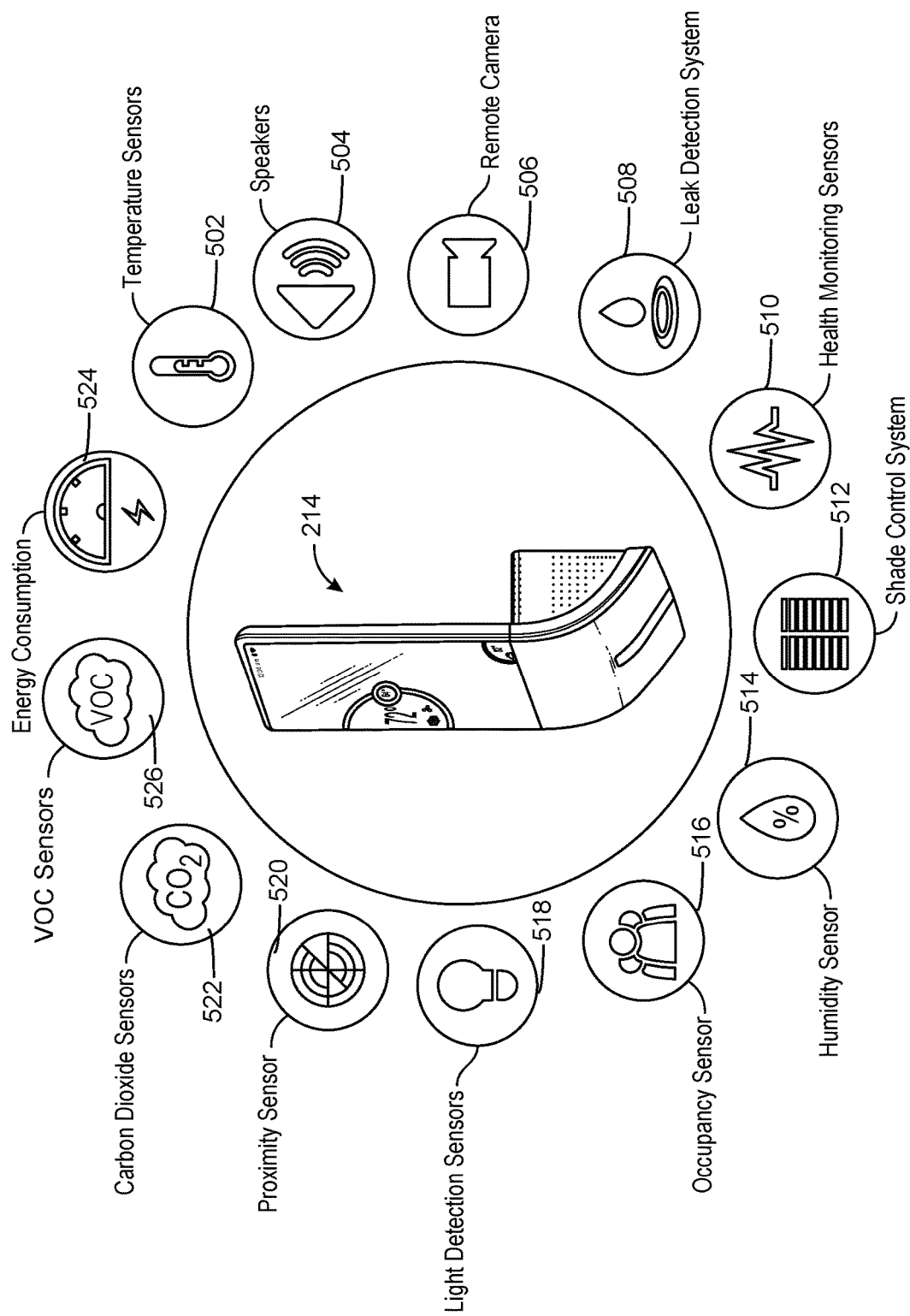
FIG. 5 is a drawing of the connections and sensors of the control device of FIG. 2 and FIG. 4, according to an exemplary embodiment.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, a light detection sensors 518, proximity sensor 520, carbon dioxide sensors 522, energy consumption sensors 524, volatile organic compound (VOC) sensors 526, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, the temperature sensors 502, the humidity sensors 514, the carbon dioxide sensors 522, and the VOC sensors 526 may be located at different locations within a building or home. Additionally, one or more of the temperature sensors 502, the humidity sensors 514, the carbon dioxide sensors 522, and the VOC sensors 526 may be located outside of the building or home to measure aspects of the outside air, such as outdoor temperature, outdoor humidity, carbon dioxide levels and VOC levels in the outside air. In further embodiments, the control device 214 may communicate with sensors both inside the building or home as well as outside the building or home.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, an HVAC system, or any of a variety of other external systems or devices which may be used in a home automation system or a building automation system. Control device 214 may provide a variety of monitoring and control interfaces to allow a user to control all of the systems and devices connected to control device 214. Exemplary user interfaces and features of control device 214 are described in greater detail below.

Figure 6:
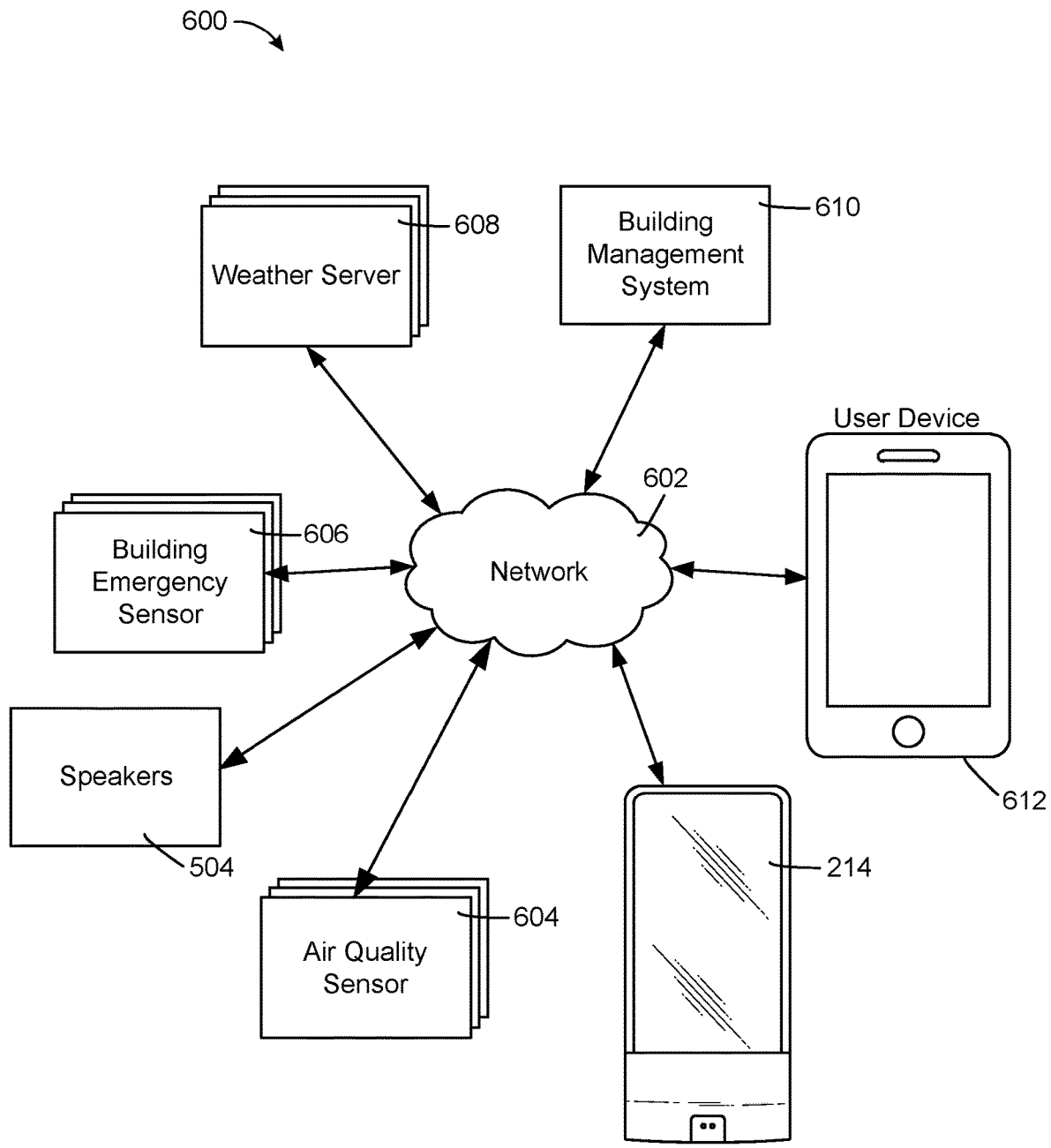
FIG. 6 is a diagram of a communications system located in the building of FIGS. 1 and 2, according to an exemplary embodiment.

Referring now to FIG. 6, a block diagram of communications system 600 is shown, according to some embodiments. System 600 can be implemented in a building (e.g. building 10) and is shown to include control device 214, network 602, air quality sensors 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, air quality information, and any other information via network 602. In some embodiments, the information is received from building management system 610 via network 602. In various embodiments, the information is received from the Internet via network 602. In some embodiments, control device 214 is at least one of, or a combination of, a thermostat, a humidistat, a light controller, and any other wall mounted and/or hand held device. In some embodiments, the control device 214 is connected to one or more air quality sensors 604. Air quality sensors 604 can include temperature sensors, humidity sensors, carbon dioxide sensors, VOC sensors, etc. In some embodiments, control device 214 is connected to building emergency sensor(s) 606. In some embodiments, building emergency sensor(s) 606 are sensors which detect building emergencies. Building emergency sensor(s) 606 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five day forecast, thirty day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency. In further embodiments, the weather server(s) 608 may be configured to provide air quality information to the control device 214. For example, the weather server(s) 608 may provide air quality information such as pollen levels, mold levels, particulate levels, etc.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In further embodiments, the building management system 610 may be configured to control one or more fans or ventilators to provide air flow into and out of a building (e.g. building 10). In some embodiments, building management system 610 may be configured to control the lighting of a building. In some embodiments, building management system 610 may be configured to transmit emergency information to control device 214. In some embodiments, the emergency information is a notification of an active shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 can be configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into calendar application. In some embodiments, calendar application is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

Figure 7:
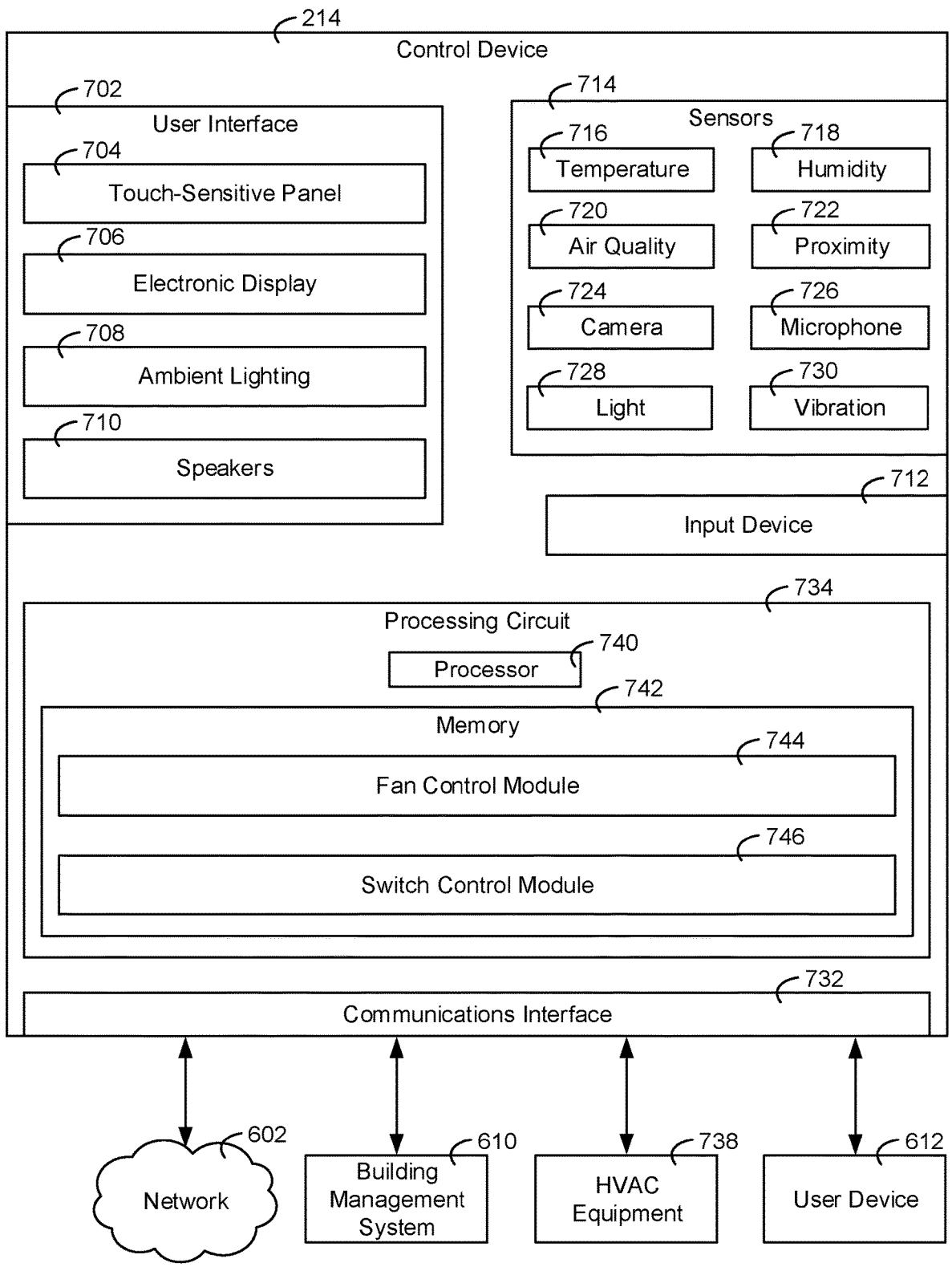
FIG. 7 is a block diagram illustrating the control device of FIGS. 2, 3, and 5 in greater detail, according to an exemplary embodiment.

Referring now to FIG. 7, a block diagram illustrating control device 214 in greater detail is shown, according to some embodiments. Control device 214 is shown to include a variety of user interface devices 702. User interface 702 may be configured to receive input from a user and provide output to a user in various forms. For example, user interface devices 702 are shown to include a touch-sensitive panel 704, an electronic display 706, ambient lighting 708, speakers 710 (e.g., speakers 504), and an input device 712. Input device 712 may include a microphone configured to receive voice commands from a user, a keyboard or buttons, switches, dials, or any other user-operable input device. It is contemplated that user interface devices 702 may include any type of device configured to receive input from a user and/or provide an output to a user in any of a variety of forms (e.g., touch, text, video, graphics, audio, vibration, etc.).

The control device 214 may also include, or be in communication with, a number of sensors 714. The sensors may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. The sensors 714 may be configured to measure various air quality sensor 720 may be configured to measure any of a variety of air quality variables such as oxygen level, carbon dioxide level, carbon monoxide level, allergens, pollutants, smoke, VOCs, etc. Proximity sensor 722 may include one or more sensors configured to detect the presence of people or devices proximate to control device 214. For example, proximity sensor 722 may include a near-field communications (NFC) sensor, a radio frequency identification (RFID) sensor, a Bluetooth sensor, a capacitive proximity sensor, a biometric sensor, or any other sensor configured to detect the presence of a person or device. Camera 724 may include a visible light camera, a motion detector camera, an infrared camera, an ultraviolet camera, an optical sensor, or any other type of camera. Light sensor 728 may be configured to measure ambient light levels. Vibration sensor 730 may be configured to measure vibrations from earthquakes or other seismic activity at the location of control device 214.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.) For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). In some embodiments, HVAC equipment 738 may be lighting systems, building systems, actuators, chillers, heaters, and/or any other building equipment and/or system. Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein.

For example, memory 742 is shown to include a fan control module 744 and a switch control module 746. The fan control module 744 may be configured to operate one or more fans associated with an HVAC system of a building. The switch control module 746 may be configured to control one or more switch devices located within the building. Switch devices are described in more detail below. Further, other modules, such as voice command and control modules, building modules, payment modules, hotel modules, healthcare modules, occupancy modules, emergency modules and the like may also be included in the memory 742. The functions of some of these modules is described in greater detail below.

In some embodiments, the control device 214 can be configured to control building equipment, e.g., indoor and/or outdoor equipment (e.g., heatpumps, furnaces, AHUs, air conditioners, etc.) to heat and/or cool a building. Whenever the control device 214 causes the building equipment to heat and/or cool the building, the control device 214 may simultaneously cause an exhaust fan to run dispelling stale air from inside the building to outside the building and/or run a supply fan to bring fresh air into the building. However, the control device 214 can also control the exhaust fan and/or supply an independent of the heating and/or cooling of the building.

Exhaust Fan Control

Figure 8:
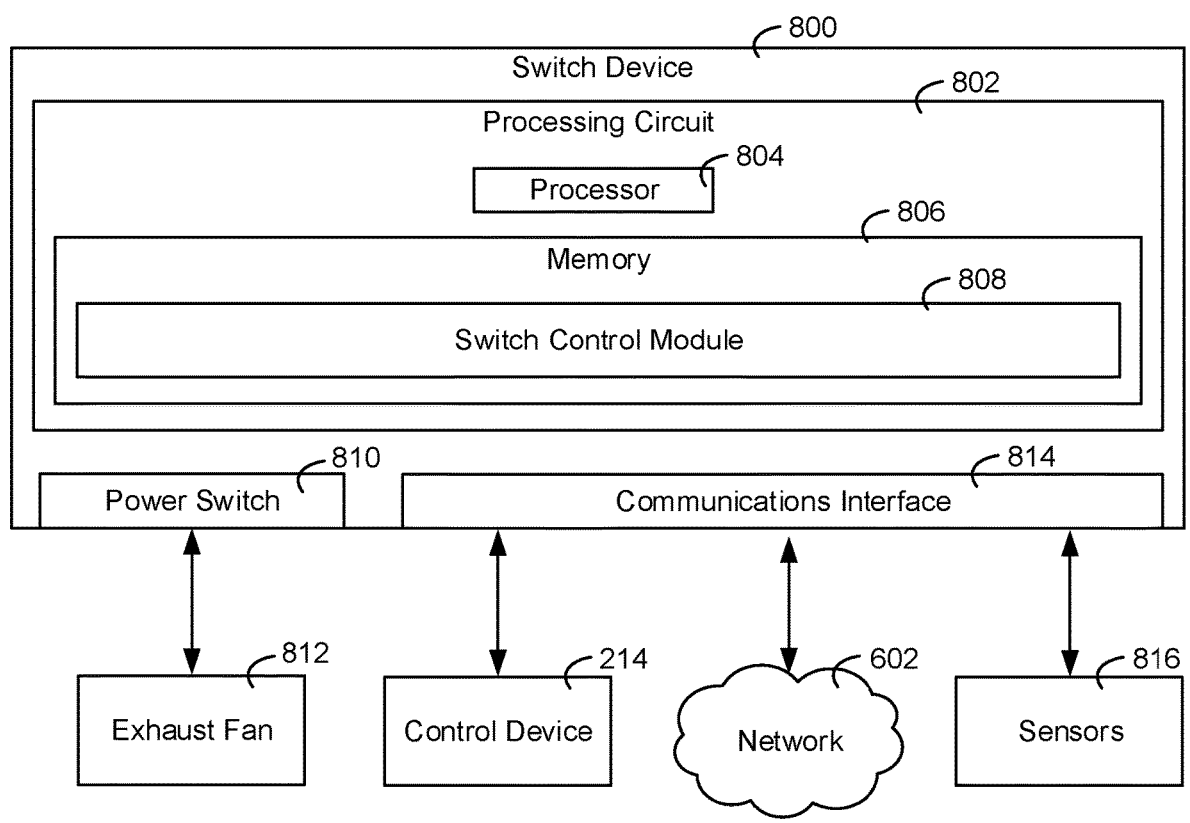
FIG. 8 is a block diagram of a switch device for controlling an exhaust fan, according to some embodiments.

Referring now to FIG. 8, a block diagram illustrating a smart, or intelligent, switch device 800 is shown, according to some embodiments. A smart switch may be any switch with an ability to communicate with a network or other control device, such as control device 214. The switch device 800 is shown to include a processing circuit 802. The processing circuit 802 includes a processor 804 and a memory 806. The processor 804 may be a general purpose or specific purpose processor, an application specific integrated circuit (ASIC), one or more field programmable gate arrays (FPGAs), a group of processing components, or other suitable processing components. The processor 804 may be configured to execute computer code or instructions stored in the memory 806 or received from other computer readable media (e.g., CDROM, network storage, a remote server, etc.).

The memory 806 may include one or more devices (e.g., memory units, memory devices, storage devices, etc.) for storing data and/or computer code for completing and/or facilitating the various processes described in the present disclosure. The memory 806 may include random access memory (RAM), read-only memory (ROM), hard drive storage, temporary storage, non-volatile memory, flash memory, optical memory, or any other suitable memory for storing software objects and/or computer instructions. The memory 806 may include database components, object code components, script components, or any other type of information structure for supporting the various activities and information structures described in the present disclosure.

The memory 806 may be communicably connected to processor 804 via the processing circuit 802 and may include computer code for executing (e.g., by processor 804) one or more processes described herein. For example, the memory 806 is shown to include a device control module

808. The device control module 808 may be configured to control a power switch 810 of the switch device 800 to provide power to a connected device, such as an exhaust fan 812.

The switch device 800 may further include a communication interface 814. The communication interface 814 may include wired or wireless interfaces (e.g., jacks, antennas, transmitters, receivers, transceivers, wire terminals, etc.) for conducting data communications with various systems, devices, or networks. For example, the communication interface 814 may include an Ethernet card and port for sending and receiving data via an Ethernet-based communications network and/or a Wi-Fi transceiver for communicating via a wireless communications network. The communication interface 814 may be configured to communicate via local area networks or wide area networks (e.g., the Internet, a building WAN, etc.) and may use a variety of communications protocols (e.g., BACnet, IP, LON, etc.).

The communication interface 814 may include a network interface configured to facilitate electronic data communications between control device 214 and various external systems or devices, such as network 602. For example, the switch device 800 may receive information from the control device 214. For example, the control device 214 may provide operating instructions to the switch device 800, such as when to provide power to the exhaust fan 812. The information received from the control device 214 may include information provided by one or more sensors, such as air quality sensors 604. Other information received from the control device 214 may include data or commands from the HVAC equipment 738. The communication interface 814 may further be in communication with one or more sensors 816. The sensors 816 may be air quality sensors, humidity sensors, temperature sensors, and the like. In some embodiments, the sensors 816 may instead of, or in addition to, be integrated into the switch device 800. For example, the switch device 800 may include integrated humidity sensors, air quality sensors, temperature sensors, and the like. In some embodiments, the sensors 816 may be a combination of integrated and external sensors.

By using a switch device 800, the ability of the control device 214 to control additional components within a building can be supplemented. Further, by using switch devices 800, existing devices, such as exhaust fans, can be retrofitted to be controlled by the control device 214. This can be advantageous where it would be difficult or economically impractical to install new equipment.

Figure 9:
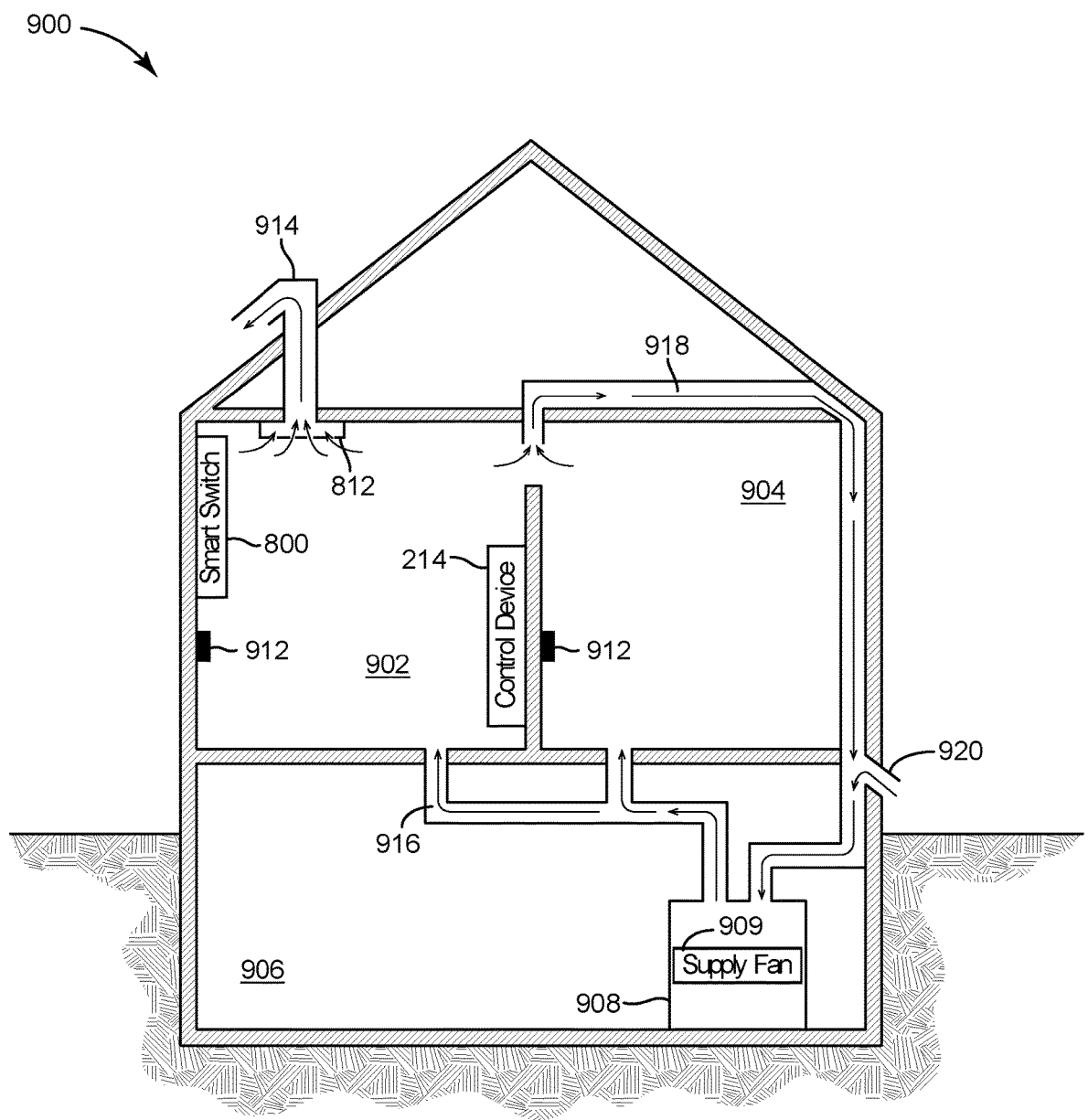
FIG. 9 is a sectional view of an illustration of a building including an HVAC system, according to some embodiments.

Turning now to FIG. 9, a sectional view of an illustration of a building 900 is shown, according to some embodiments. The building may include a first zone 902, a second zone 904, and a third zone 906. In one embodiment, the first zone 902 and the second zone 904 are rooms in a building, and the third zone 906 is a basement. However, the building 900 may have other configurations, including different zone types and different numbers of zones. The building 900 may further include an indoor unit 908, an exhaust fan 812, a number of sensors 912, a switch device 800, and a control device, such as control device 214, described elsewhere herein. The exhaust fan 812 may be a bathroom fan, a laundry room fan, a cooking vent, etc.

In one embodiment, the sensors 912 may be humidity sensors, air quality sensors, temperature sensors, or a combination thereof. While shown as being internal to the building 900, it is contemplated that one or multiple of the sensors 912 may be external to the building for measuring outside air parameters. In one embodiment, the sensors 912 may in communication with the control device 214. In other embodiments, the sensors 912 may be in communication with the switch device 800. In some embodiments, the sensors 912 may in communication with both the control device 214 and the switch device 800.

The switch device 800 may be in communication with the exhaust fan 812. In some embodiments, the switch device 800 can be configured to control the operation of the exhaust fan 812. For example, the switch device 800 may be configured to selectively provide power to the exhaust fan 812 to cause the exhaust fan 812 to run or to not run. In some embodiments, the switch device 800 may include a manual switch to allow a user to operate the exhaust fan 812. In this regard, the switch device 800 may be a wall switch, e.g., similar to a light switch, that can be installed in a wall where a conventional switch might be located. This can allow the control device 214 to operate the exhaust fan 812 in addition to allowing a user to manually switch the exhaust fan 812 on or off The switch device 800, as described above, may further be capable of operating the exhaust fan 812 based on determining that certain parameters are met, as will be described below. In one embodiment, the switch device 800 may further be in communication with the control device 214, and may receive commands or data from the control device 214. In one embodiment, the exhaust fan 812 is configured to exhaust air from building 900 via an exhaust duct 914. Exhausting the air from the interior of the building 900 to the outside atmosphere can generate a negative pressure within the building 900. Further, exhausting the air from the interior of the building 900 to the outside atmosphere can aid in reducing humidity in one or more portions of the building 900. Creating a negative pressure may allow fresh air to enter the building 900, e.g., enter the building 900 via the outdoor air inlet 920.

The indoor unit 908 may be a furnace and/or an AHU (e.g., a roof top unit). The indoor unit 908 may provide conditioned air to the building 900 via one or more air supply ducts 916. The indoor unit 908 may heat and/or cool the air supplied to the building 900 to reach a temperature set point commanded by the control device 214. The indoor unit 908 may intake inside air via one or more air return ducts 918. The return air may be supplemented with outside air via outdoor air inlet 920. By supplementing the return air with outdoor air, the air quality within the building 900 may be improved.

The indoor unit 908 may include a supply fan 909 configured to supply air from outside the building 900 to the building 900. The supply fan 909 can be operated by the control device 214. The control device 214 can provide a command to the supply fan 909 to run and/or not run. Furthermore, the control device 214 can cause the indoor unit 908 to heat and/or cool the building 900 while running the supply fan 909. In some embodiments, in response to poor indoor air quality, the control device 214 can run the supply fan 909 with the exhaust fan 812 or independent from the exhaust fan 812 to exhaust air from inside the building 900 to outside the building 900 (via the exhaust fan 812) and bring fresh air into the building 900 (via the supply fan 909 and the outdoor air inlet 920). In some embodiments, the supply fan 909 is a standalone device mounted in the wall of the building 900 configured to bring fresh air into the building 900. For example, in some embodiments, the supply fan 909 is an exhaust fan mounted in an inverse manner such that fresh air is supplied to the building 900 from outside the building 900.

Figure 10:
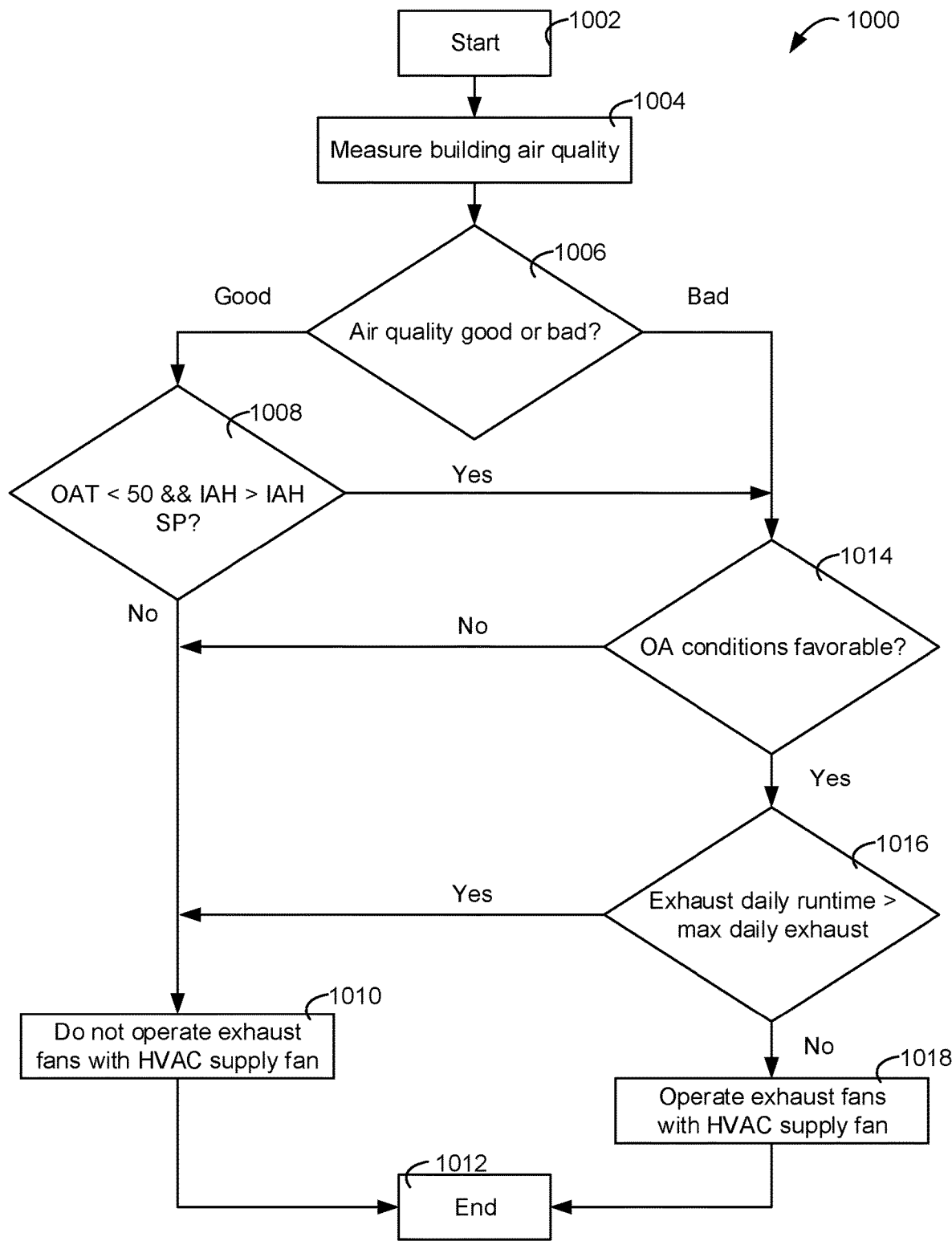
FIG. 10 is a flow diagram illustrating an exhaust fan control process, according to some embodiments.

Turning to FIG. 10, a flow chart illustrating a process 1000 for controlling one or more exhaust fans, such as exhaust fan 812, to improve air quality in a building is shown, according to some embodiments. By controlling the exhaust fans, supplemental fresh air may be provided to the building by creating additional negative pressure within the building, thereby allowing more outside air to enter the building, such as via outdoor inlet 920. This can allow existing exhaust fans to be controlled to supplement the operation of an HVAC system associated with the building. While process 1100 is primarily described with reference to control device 214, the switch device 800 and/or the control device 214 can be configured to perform some and/or all of the process 1100.

The process 1000 may start at process block 1102. For example purposes, the process 1000 will be described in regards to the building 900 described above. However, other implementations are contemplated. Further, the various process steps described below may be performed by the control device 214, the switch device 800, or a combination thereof. At process block 1004, the building air quality is measured. In one embodiment, the one or more sensors, such as sensors 912, may output data related to the building air quality. For example, the sensors may provide information such as humidity measurements, temperature measurements, carbon dioxide measurements, VOC measurements, or other air quality measurements. In some embodiments, the building air quality measurements are provided to the control device 214 for processing. In other embodiments, the switch device 800 may receive the air quality measurements for processing.

At process block 1006 it is determined whether the air quality is good or bad based on the building air quality measurements. In some embodiments, the control device 214 determines whether the air quality is good or bad. In some embodiments, the switch device 800 may determine whether air quality is good or bad. The air quality may be determined to be good or bad based on evaluating certain measured air quality values. For example, VOC levels, CO2 levels, pollen levels, particulate levels, humidity, temperature and/or other values may be evaluated to determine whether the air quality is good or bad. These values may be compared against predefined threshold levels, which can provide an indication of whether the air quality average is good or bad. For example, where none of the measured values exceeds the predefined threshold levels, the air quality may be determined to be good. In contrast, if one or more of the measured values exceeds a threshold value, the air quality average may be determined to be bad. In some embodiments, a certain number of measured values may need to exceed the predefined thresholds for the air quality to be considered bad. In some embodiments, the various air quality values may be evaluated to generate an air quality "score." The score may be a numerical value (e.g. 1-100), an alphabetical value (e.g. A-F), or other representative value. The score may then be used to determine whether the air quality is good or bad. For example, using a numerical value scoring system where zero is the highest air quality score (e.g. best air quality), and one hundred is the lowest air quality score (e.g. worst air quality), a score above fifty may indicate that the air quality average is "bad." However, it is contemplated that other scores may be used to determine whether the air quality average is good or bad. As another example, a high value (e.g., 100) may indicate good air quality while a low value (e.g., 0) may indicate a low air quality. If the air quality is above a predefined amount, this may indicate that the air quality is good and then the exhaust fan 914 does not need to run. However, if the air quality is below the predefined amount, this may indicate that the air quality is bad and the exhaust fan 914 does need to run.

If the air quality is determined to be good at process block 1006, the control device 214 (or the switch device 800) determines if the outdoor air temperature is less than a predefined amount (e.g., 50° F.), and if the indoor ambient humidity (IAH) is greater than an IAH setpoint (SP) at process block 1008. If the OAT is not less than the predefined amount or the IAH is not greater than the IAH setpoint, the exhaust fan 812 is not allowed to run at process block 1010. In some embodiments, it may be determined not to run the exhaust fans with an HVAC supply fan. However, the exhaust fan may still be able to be operated directly by a user via the switch device 800. The process may then end at process block 1012.

If the OAT is less than the predefined amount and the IAH is greater than the IAH SP, the process 1000 proceeds to process block 1014. If the air quality is determined to be bad at block 1006, the process 1000 also proceeds to process block 1014. At process block 1014, the control device 214 determines if the outdoor air conditions are favorable for operation of the exhaust fan 812. The control device 214 may evaluate outdoor air conditions, such as temperature, humidity, etc. to determine if the outdoor air conditions are favorable for operating the exhaust fan. For example, where the outdoor temperature is too high or too low, or the humidity level is too high or too low, the conditions may be determined not to be favorable for operation of the exhaust fan. Specific examples may include determining that the outside air conditions are unfavorable when the temperature is above 90° F., or if the humidity level is over 75%. By evaluating the outdoor air conditions the exhaust fan may be allowed to run automatically in most situations unless the outdoor conditions are extremely poor (i.e., exceptionally cold in winter, or exceptionally hot and humid in the summer). The outdoor conditions can be determined to be good or bad in a similar manner as at block 1006.

In some embodiments, block 1014 may be optional. For example, the process 1000 may always assume that outdoor air quality conditions are good. Similarly, the process 1000 might assume that the outdoor air quality conditions are better than the indoor air quality conditions and therefore anytime the indoor air quality is poor, regardless of the outdoor air quality, the exhaust fan 812 and/or the supply fan 909 can be run.

If the outdoor air conditions are not favorable, the exhaust fan 812 is not operated at process block 1010 as described above. If the outside air conditions are determined to be favorable, the process proceeds to process block 1016. At process block 1016 the control device 214 (or the switch device 800) determines if the exhaust fan 812 runtime over a given period of time exceeds the maximum runtime for a given time frame. For example, a runtime over a twenty-four hour period of the exhaust fan 812 is evaluated to determine if it exceeds a max runtime in the same twenty-four hour period. In other embodiments, the period of time may be a calendar day. However, other amount of time are also contemplated, such as one hour, twelve hours, and the like. By determining if the exhaust fan 812 has operated over a given period of time for more than a maximum runtime, the control device 214 (or the switch device 800) can prevent running the exhaust fan when exhaust-based ventilation isn't enough to keep the humidity or air quality level under control. For example, if the exhaust based ventilation is insufficient to maintain the desired or required humidity and/or air quality levels, this may be reflected in the exhaust fan 812 being operated more than an allowable amount in the given time period. By not allowing the exhaust fan 812 to be operated more than an allowable amount in a given time period, damage to the exhaust fan 812 may be prevented. The control device 214 can record, using various timers or timing devices, how long the exhaust fan 812 has been running during the particular time period.

If the exhaust fan 812 is determined to have exceeded the maximum allowable runtime for the given time period, the exhaust fan 812 is not operated at process block 1010. If the exhaust fan 812 is determined to not have exceeded the maximum allowable runtime for the given time period, the exhaust fan 812 may be operated in conjunction with an HVAC supply fan at process block 1018, e.g., the supply fan 909. In one embodiment, the control device 214 may instruct the switch device 800 to operate the exhaust fan when the HVAC supply fan is in operation. In other embodiments, the control device 214 may simply inform the switch device 800 that the HVAC supply fan is running, and the switch device 800 may then operate the exhaust fan. The process 1000 may then end at process block 1012.

In some embodiments, a minimum exhaust fan runtime can be used to control the exhaust fan 812 by the control device 214. For example, a user may set and/or adjust the minimum exhaust fan runtime via the user interface 702. For example, the control device 214 can operate the exhaust fan 812 for at least the minimum exhaust fan runtime during a predefined time period, e.g., an hour, a day, a week, etc. If the indoor air quality is determined to be good, the control device 214 can skip the minimum exhaust fan runtime in part or in its entirety to save energy.

Figure 11:
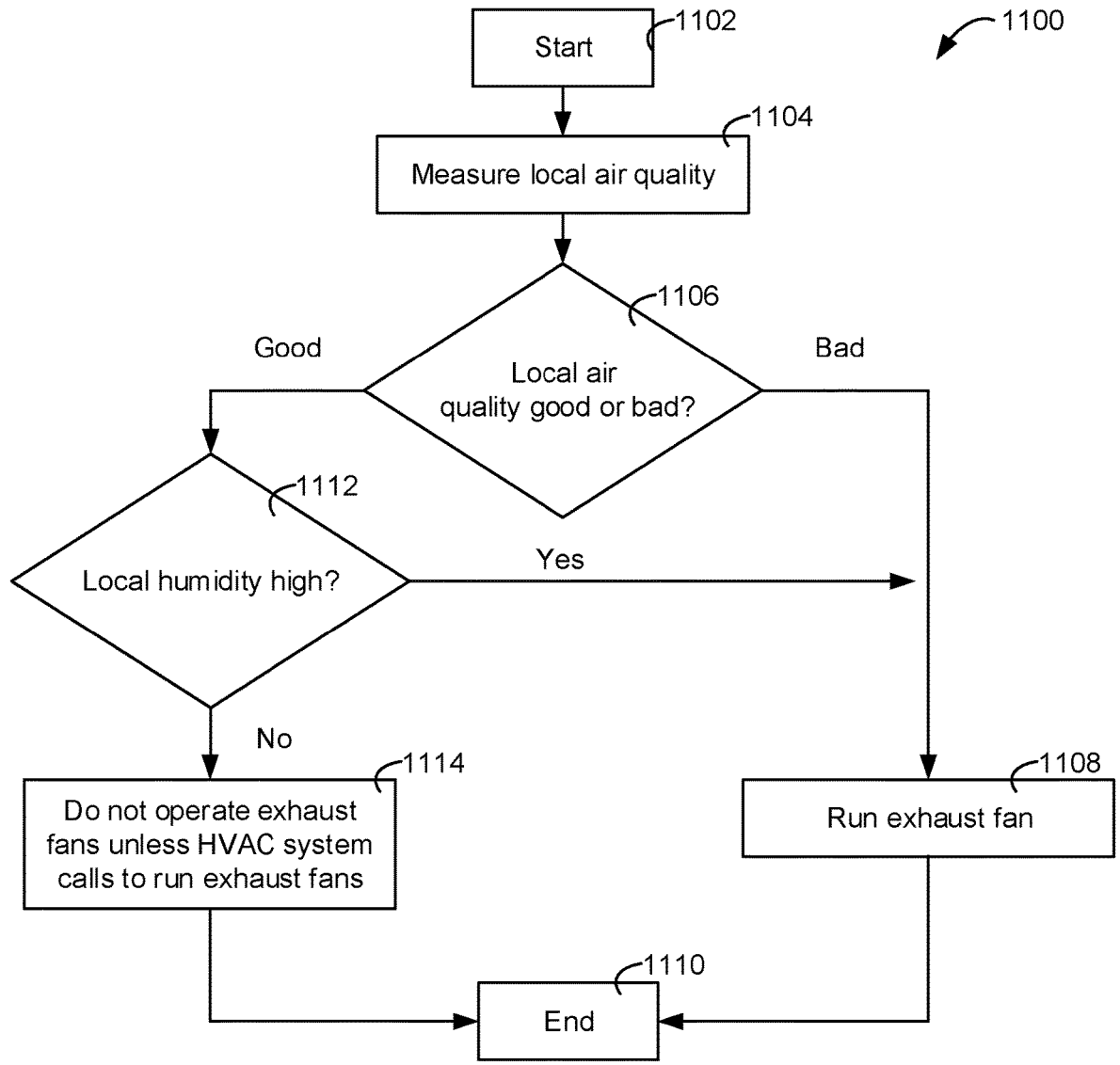
FIG. 11 is a flow diagram illustrating a local exhaust fan control process, according to some embodiments.

Turning now to FIG. 11, a flow chart illustrating a local exhaust fan control process 1100 is shown, according to some embodiments. The process 1100 may allow for a local controller, such as the switch device 800 to respond to adverse humidity or air quality conditions within a local portion of a building (e.g. room, zone, etc.) that the exhaust fan is installed in. For example, in reference to FIG. 9, the switch device 800 may provide local control of exhaust fan 812 based on the conditions within the first zone 902. While process 1100 is primarily described with reference to switch device 800, the switch device 800 and/or the control device 214 can be configured to perform some and/or all of the process 1100.

The process may be initiated at process block 1102. At process block 1104, a local air quality is measured. As described above, the local air quality may be associated with a specific location within a building. For example, the first zone 902 of building 900. In one embodiment, one or more sensors, such as sensors 912, may output data related to the local air quality to the switch device 800. For example, the sensors 912 may provide information such as humidity measurements, temperature measurements, carbon dioxide measurements, VOC measurements, or other local air quality measurements. In some embodiments, the local air quality measurements are provided to the switch device 800 for processing.

At process block 1106 it is determined whether the local air quality is good or bad based on the building air quality measurements. In some embodiments, the switch device 800 determines whether the local air quality is good or bad. The air quality may be determined to be good or bad based on evaluating certain measured air quality values. For example, VOC levels, CO2 levels, pollen levels, particulate levels, humidity, temperature and/or other values may be evaluated to determine whether the air quality is good or bad. These values may be compared against predefined threshold levels, which can provide an indication of whether the air quality average is good or bad. For example, where none of the measured values exceeds the predefined threshold levels, the air quality may be determined to be good.

In contrast, if one or more of the measured values exceeds a threshold value, the air quality average may be determined to be bad. In some embodiments, a certain number of measured values may need to exceed the predefined thresholds for the air quality to be considered bad. In some embodiments, the various air quality values may be evaluated to generate an air quality "score." The score may be a numerical value (e.g. 1-100), an alphabetical value (e.g. A-F), or other representative value. The score may then be used to determine whether the air quality is good or bad.

For example, using a numerical value scoring system where zero is the highest air quality score (e.g. best air quality), and one hundred is the lowest air quality score (e.g. worst air quality), a score above fifty may indicate that the air quality average is "bad." As another example, high alphabetical values, e.g., A, may represent the best air quality while a low air quality may be represented by an alphabetical value, e.g., F. If the alphabetical value is above or equal to "C," the local air quality may be good. If the air quality is less than C, the local air quality may be bad. However, it is contemplated that other scores may be used to determine whether the air quality average is good or bad.

If the local air quality is determined to be bad, the switch device 800 operates the exhaust fan 812 at process block 1108. In some embodiments, the switch device 800 may operate the exhaust fan 812 for a predetermined period of time. For example, the switch device 800 may operate the exhaust fan 812 for five minutes. In other embodiments, the switch device 800 may operate the exhaust fan 812 until the local air quality is no longer bad, or until the exhaust fan 812 operation exceeds a maximum runtime. The process may then end at process block 1110.

If the air quality is determined to be good at process block 1106, the switch device 800 determines if the local humidity exceeds a predetermined threshold at process block 1112. The local humidity may be affected by having multiple persons in the local area. Where the local area is a bathroom, a shower may increase the humidity of the local area. In some embodiments, the predetermined threshold may by 70%. However, threshold values above 70% or below 70% are also contemplated. If the local humidity level is determined to not exceed the predetermined threshold, the exhaust fan 812 is not operated unless an HVAC system calls for it at process block 1114. For example, the control device 214, as described above, may instruct the switch device 800 to operate the exhaust fan when the HVAC supply fan is in operation. The process may then end at process block 1110. If the local humidity is determined to be high at process block 1112, the exhaust fan 812 may be run at process block 1108 as described above.

In some embodiments, if the exhaust fan 812 is run by the switch device 800, the exhaust fan 812 may communicate a supply fan run command to the control device 214 to run a supply fan, e.g., a supply fan of the indoor unit 908. In response to receiving the supply fan run command from the switch device 800, the control device 214 can cause the supply fan to run. Running both the exhaust fan 812 by the switch device 800 and the supply fan by the control device 214 may move good air from outside the building 900 to inside the building 900 and bad air from inside the building 900 to outside the building 900. The exhaust fan 812 can cause a negative pressure exhausting air from inside the building 900 to outside the building 900. The supply fan can bring fresh air in from the inlet 920.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, and air conditioning (HVAC) system for controlling air quality of a first building space and a second building space of a building, the system comprising:
    an air quality sensor configured to sense the air quality of the first building space;
    an exhaust fan configured to exhaust air from inside the second building space of the building to outside the second building space;
    a switch device configured to control the exhaust fan to exhaust the air from inside the second building space to outside the second building space, wherein the exhaust fan is located in the second building space, wherein the switch device includes a circuit configured to receive a local air quality of the second building space, to compare the local air quality to a level, to operate the exhaust fan in response to a switch device determination that the local air quality is less than the level, and to operate the exhaust fan in response to receiving a command from a controller; and
    the controller comprising a processing circuit communicably coupled to the switch device, wherein the processing circuit of the controller is configured to:
        determine an air quality level of the first building space based on the air quality sensed by the air quality sensor;
        determine whether the air quality level is less than an air quality threshold;
        cause the switch device to operate the exhaust fan to exhaust the air from inside the second building space to outside the second building space in response to a determination that the air quality level is less than the air quality threshold; and
        operate a supply fan to move outdoor air from outside the building into the building in response to the determination that the air quality level is less than the air quality threshold.

2. The system of claim 1, wherein the processing circuit of the controller is configured to:
    cause the switch device to operate the exhaust fan to exhaust the air from inside the second building space to outside the second building space for a predefined length of time during a particular time period; and
    cause the switch device to not operate the exhaust fan to exhaust the air from inside the second building space to outside the second building space for a total amount of the predefined length of time in response to a second determination that the air quality level is greater than the air quality threshold.

3. The system of claim 1, further comprising the supply fan configured to circulate the air within the building and an air inlet configured to allow the outdoor air from outside the building to enter the building, wherein the supply fan circulating the air within the building and the exhaust fan exhausting the air from inside the second building space to outside the second building space causes the outdoor air from outside the building to enter the building via the air inlet.

4. The system of claim 1, wherein the processing circuit of the controller is configured to:
    determine a runtime of the exhaust fan, wherein the runtime is a length of time that the exhaust fan has run during a particular time period;
    determine whether the runtime of the exhaust fan is greater than, equal to, or less than a predefined runtime;
    cause the switch device to operate the exhaust fan to exhaust the air from inside the second building space to outside the second building space in response to the determination that the air quality level is less than the air quality threshold and a second determination that the runtime of the exhaust fan is less than the predefined runtime; and cause the switch device to not operate the exhaust fan to exhaust the air from inside the second building space to outside the second building space in response to the determination that the air quality level is less than the air quality threshold and a third determination that the runtime of the exhaust fan is greater than or equal to the predefined runtime.

5. The system of claim 1, wherein the processing circuit of the controller is configured to:
receive or determine an outdoor air quality level;
determine whether the outdoor air quality level is less than an outdoor air quality threshold;
cause the switch device to operate the exhaust fan to exhaust the air from inside the second building space to outside the second building space in response to the determination that the air quality level is less than the air quality threshold and a second determination that the outdoor air quality level is greater than the outdoor air quality threshold; and
cause the switch device to not operate the exhaust fan to exhaust the air from inside the second building space to outside the second building space in response to the determination that the air quality level is less than the air quality threshold and a third determination that the outdoor air quality level is less than the outdoor air quality threshold.

6. The system of claim 1, wherein the air quality level is based on at least one of a humidity level, a temperature level, a carbon dioxide ($CO_2$) concentration level, and a volatile organic compound (VOC) concentration level.

7. The system of claim 1, further comprising a plurality of air quality sensors comprising the air quality sensor and one or more other air quality sensors, wherein the plurality of air quality sensors comprise two or more of a humidity sensor, a temperature sensor, a $CO_2$ sensor, and a VOC sensor.

8. The system of claim 1, wherein the exhaust fan is configured to exhaust the air from inside the second building space to outside the second building space causing the outdoor air outside the building to enter the building;
wherein the processing circuit of the controller is configured to:
determine whether the outdoor air outside the building is dry by determining whether an outdoor air temperature (OAT) is less than a predefined OAT threshold; and
cause the switch device to operate the exhaust fan to exhaust the air from inside the second building space to outside the second building space causing the outdoor air outside the second building space to enter the second building space causing the second building space to be dehumidified in response to a second determination that the OAT is less than the predefined OAT threshold.

9. The system of claim 1, wherein the processing circuit of the controller is configured to:
determine whether an outdoor air temperature (OAT) is less than a predefined OAT threshold and an indoor air humidity (IAH) level is greater than an IAH setpoint; and
cause the switch device to operate the exhaust fan to exhaust the air from inside the second building space to outside the second building space in response to the determination that the air quality level is less than the air quality threshold and a second determination that the OAT is less than the predefined OAT threshold and the IAH level is greater than the IAH setpoint.

10. The system of claim 1, wherein the processing circuit of the controller is configured to operate the exhaust fan to exhaust the air from inside the second building space to outside the second building space in response to one or more heating or cooling devices associated with the second building space being in operation to cause the second building space to be heated or cooled;
wherein the controller is a thermostat, wherein the processing circuit of the thermostat is configured to control the one or more heating or cooling devices associated with the second building space to heat or cool the second building space.

11. The system of claim 1, further comprising the supply fan configured to supply the outdoor air from outside the building to inside the building;
wherein the switch device is configured to provide an indication to control the supply fan to the controller in response to the switch device determination that the local air quality is less than the level;
wherein the processing circuit of the controller is configured to:
receive the indication to control the supply fan from the switch device; and
control the supply fan to supply the outdoor air from outside the building to inside the building in response to receiving the indication to control the supply fan from a control circuit of the switch device.

12. The system of claim 1, wherein the local air quality is a humidity level;
wherein the switch device is configured to control the exhaust fan to exhaust the air from inside the the second building space to outside the second building space based on the humidity level.

13. A method for controlling air quality of a first building space and a second building space of a building, the method comprising:
determining, by a controller, an air quality level of the first building space based on air quality sensed by an air quality sensor;
determining, by the controller, whether the air quality level is less than an air quality threshold;
causing, by the controller, a switch device to operate an exhaust fan to exhaust air from inside the second building space to outside the second building space in response to a determination that the air quality level is less than the air quality threshold, wherein the exhaust fan is located in the second building space;
operating, by the controller, a supply fan to move outdoor air from outside the building into the building in response to the determination that the air quality level is less than the air quality threshold;
operating, by the switch device, the exhaust fan in response to receiving a command from the controller;
receiving, by the switch device, a local air quality of the second building space;
comparing, by the switch device, the local air quality to a level; and
operating, by the switch device, the exhaust fan in response to a switch device determination that the local air quality is less than the level.

14. The method of claim 13, further comprising:
receiving or determining, by the controller, an outdoor air quality level;
determining, by the controller, whether the outdoor air quality level is less than or greater than an outdoor air quality threshold;

causing, by the controller, the switch device to operate the exhaust fan to exhaust the air from inside the second building space to outside the second building space in response to the determination that the air quality level is less than the air quality threshold and a second determination that the outdoor air quality level is greater than the outdoor air quality threshold;

causing, by the controller, the switch device to not operate the exhaust fan to exhaust the air from inside the second building space to outside the second building space in response to the determination that the air quality level is less than the air quality threshold and a third determination that the outdoor air quality level is less than the outdoor air quality threshold;

causing, by the controller, the supply fan of the building to supply the outdoor air from outside the building to inside the building in response to the determination that the air quality level is less than the air quality threshold and the second determination that the outdoor air quality level is greater than the outdoor air quality threshold; and causing, by the controller, the supply fan to not supply the outdoor air from outside the building to inside the building in response to the determination that the air quality level is less than the air quality threshold and the third determination that the outdoor air quality level is less than the outdoor air quality threshold.

15. The method of claim 13, further comprising:
providing, by the switch device, an indication to control the supply fan to the controller in response to the switch device determination that the local air quality is less than the level;
receiving, by the controller, the indication to control the supply fan from the switch device; and
controlling, by the controller, the supply fan to supply the outdoor air from outside the building to inside the building in response to receiving the indication to control the supply fan from a control circuit of the switch device.

16. A building system for controlling air quality of a first building space and a second building space of a building, comprising:
an air quality sensor configured to sense the air quality of the first building space;
a switch device configured to control an exhaust fan to exhaust air from inside the second building space to outside the second building space, wherein the exhaust fan is located in the second building space, wherein the switch device includes a circuit configured to receive a local air quality of the second building space, to compare the local air quality to a level, to operate the exhaust fan in response to a switch device determination that the local air quality is less than the level, and to operate the exhaust fan in response to receiving a command from a controller; and
a processing circuit of the controller configured to:
determine an air quality level of the first building space based on the air quality sensed by the air quality sensor;
determine whether the air quality level is less than an air quality threshold; and
cause a supply fan of the building to supply outdoor air from outside the building to inside the building in response to a determination that the air quality level is below the air quality threshold, wherein the supply fan configured to supply the outdoor air from outside the building to inside the building; and
cause the switch device to operate the exhaust fan to exhaust the air from inside the second building space to outside the second building space in response to the determination that the air quality level is less than the air quality threshold.

17. The building system of claim 16, wherein the processing circuit of the controller is configured to:
receive or determine an outdoor air quality level;
determine whether the outdoor air quality level is less than an outdoor air quality threshold;
cause the switch device to operate the exhaust fan to exhaust the air from inside the second building space to outside the second building space and cause the supply fan of the building to supply the outdoor air from outside the building to inside the building in response to the determination that the air quality level is less than the air quality threshold and a second determination that the outdoor air quality level is greater than the outdoor air quality threshold;
cause the switch device to not operate the exhaust fan to exhaust the air from inside the second building space to outside the second building space; and
cause the supply fan of the building to not supply the outdoor air from outside the building to inside the building in response to the determination that the air quality level is less than the air quality threshold and a third determination that the outdoor air quality level is less than the outdoor air quality threshold.

18. The building system of claim 16, wherein the air quality level is at least one of a humidity level, a temperature level, a carbon dioxide (CO2) concentration level, and a volatile organic compound (VOC) concentration level.

19. The building system of claim 16, wherein the local air quality is at least one of a humidity, a temperature, a carbon dioxide (CO2) concentration, and a volatile organic compound (VOC) concentration.

20. The building system of claim 16, wherein the processing circuit of the controller is configured to:
receive an indication to control the supply fan from the switch device; and
control the supply fan to supply the outdoor air from outside the building to inside the building in response to receiving the indication to control the supply fan from a control circuit of the switch device.

* * * * *